(12) United States Patent
Rindal

(10) Patent No.: US 12,489,620 B2
(45) Date of Patent: Dec. 2, 2025

(54) THRESHOLD SECRET SHARE GENERATION FOR DISTRIBUTED SYMMETRIC CRYPTOGRAPHY

(71) Applicant: VISA INTERNATIONAL SERVICE ASSOCIATION, San Francisco, CA (US)

(72) Inventor: Peter Rindal, Sunnyvale, CA (US)

(73) Assignee: Visa International Service Association, San Francisco, CA (US)

( * ) Notice: Subject to any disclaimer, the term of this patent is extended or adjusted under 35 U.S.C. 154(b) by 88 days.

(21) Appl. No.: 18/693,691

(22) PCT Filed: Sep. 22, 2021

(86) PCT No.: PCT/US2021/051575
§ 371 (c)(1),
(2) Date: Mar. 20, 2024

(87) PCT Pub. No.: WO2023/048711
PCT Pub. Date: Mar. 30, 2023

(65) Prior Publication Data
US 2024/0396726 A1 Nov. 28, 2024

(51) Int. Cl.
*H04L 9/06* (2006.01)
*H04L 9/08* (2006.01)
*H04L 9/32* (2006.01)

(52) U.S. Cl.
CPC .......... *H04L 9/0869* (2013.01); *H04L 9/0618* (2013.01); *H04L 9/085* (2013.01);
(Continued)

(58) Field of Classification Search
CPC ..... H04L 9/085; H04L 9/3218; H04L 9/0869; H04L 9/0618; H04L 9/3221; H04L 2209/046
(Continued)

(56) References Cited

U.S. PATENT DOCUMENTS 9,565,020 B1 * 2/2017 Camenisch ........... H04L 9/0863
2016/0087792 A1 3/2016 Smith et al.
(Continued)

FOREIGN PATENT DOCUMENTS

| JP | 2020532771 A | 11/2020 |
| KR | 20210097786 A | 8/2021 |
| WO | 2018203186 A1 | 11/2018 |

OTHER PUBLICATIONS

Application No. PCT/US2021/051575, International Search Report and Written Opinion, Mailed On Jun. 9, 2022, 9 pages.

*Primary Examiner* — Thanh T Le
(74) *Attorney, Agent, or Firm* — Kilpatrick Townsend & Stockton LLP

(57) ABSTRACT

Methods and systems for securely generating secret shares in a distributed manner and distributing those secret shares to cryptographic devices are disclosed. The cryptographic devices can subsequently use these secret shares to perform threshold distributed cryptographic operations (such as encryption or decryption). A threshold number of generating cryptographic devices can each generate their own secret shares. These devices can also each generate partial secret shares that can be combined by receiving cryptographic devices to generate their own respective secret shares. Additionally, the generating devices can generate commitments corresponding to their secret shares. The generating devices can transmit the commitments to the other cryptographic devices and the partial secret shares to their corresponding receiving devices. At a later time, cryptographic devices possessing at least a threshold number of secret shares can collectively perform cryptographic operations using those secret shares.

20 Claims, 12 Drawing Sheets

(52) U.S. Cl.
CPC .......... *H04L 9/3218* (2013.01); *H04L 9/3221* (2013.01); *H04L 2209/046* (2013.01)

(58) Field of Classification Search
USPC .......................................................... 380/44
See application file for complete search history.

(56) References Cited

U.S. PATENT DOCUMENTS

| | | | |
|---|---|---|---|
| 2020/0259651 A1* | 8/2020 | Mohassel | H04L 9/3218 |
| 2021/0018953 A1* | 1/2021 | Ford | G06F 1/10 |
| 2021/0158342 A1* | 5/2021 | Bartolucci | G06Q 20/3825 |
| 2021/0194874 A1* | 6/2021 | Herder, III | G06N 3/04 |
| 2023/0361993 A1* | 11/2023 | Camenisch | H04L 9/0825 |

* cited by examiner

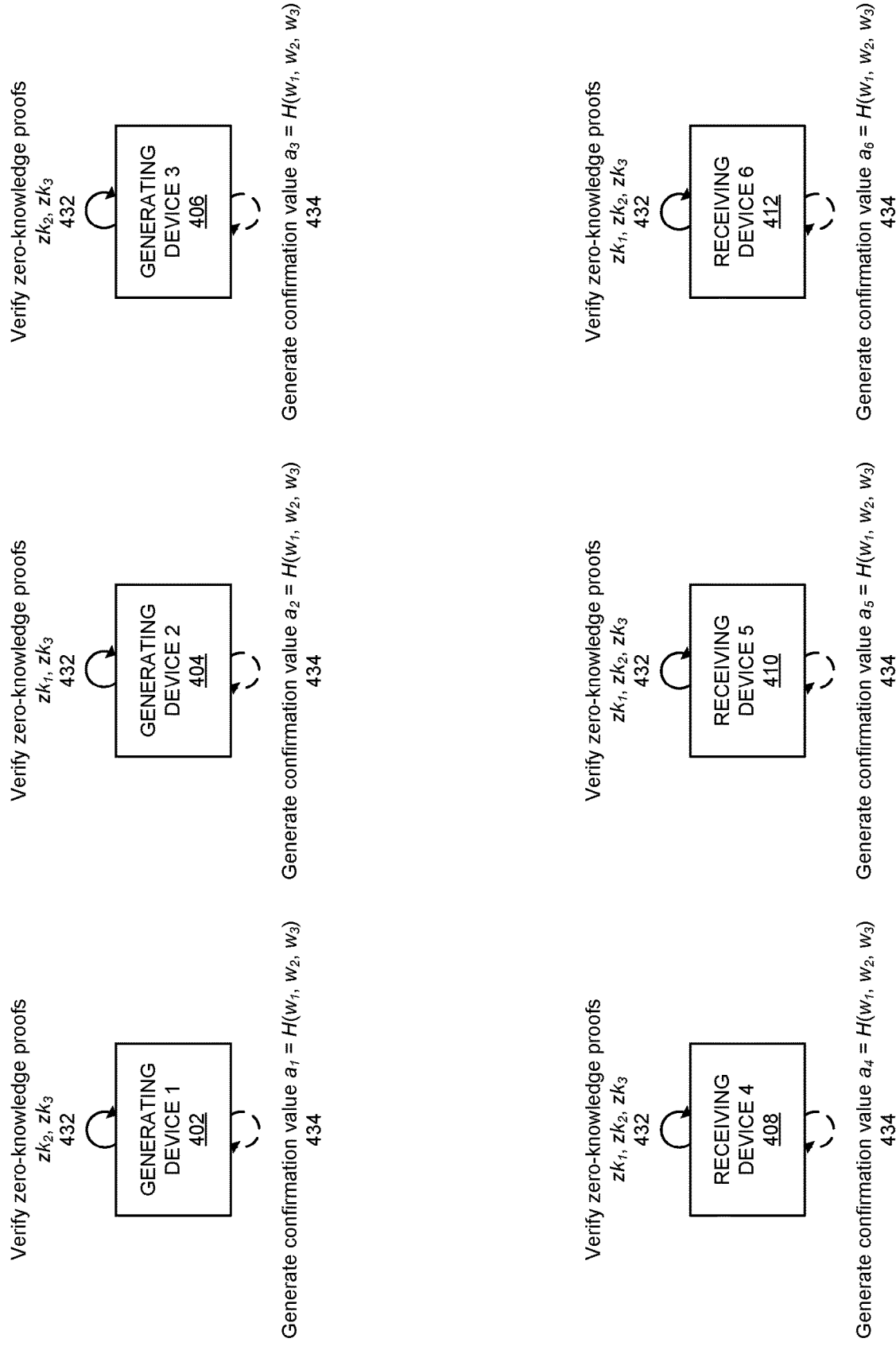

THRESHOLD SECRET SHARE GENERATION FOR DISTRIBUTED SYMMETRIC CRYPTOGRAPHY

The present application is a 371 application of International Application No. PCT/US2021/051575, with an international filing date of Sep. 22, 2021, entitled "THRESHOLD SECRET SHARE GENERATION FOR DISTRIBUTED SYMMETRIC CRYPTOGRAPHY", the entire contents of which are herein incorporated by reference for all purposes.

BACKGROUND

Distributed cryptography can include methods whereby multiple devices, computers, or parties collectively perform cryptographic operations, such as encryption or decryption. This is in contrast to standard cryptography, where a single device can use a cryptographic key or keys to encrypt plaintext, decrypt ciphertext, form a digital signature, etc. In distributed cryptography, each participating cryptographic device can possess one or more secret shares (also known as key shares). Some number of participating cryptographic devices can use their secret shares to perform encryption or decryption operations. As an example, the participating cryptographic devices can use their secret shares to generate a session key and the session key can be used to encrypt a message or decrypt a ciphertext.

Distributed cryptography can be used to implement "cryptography as a service," which may refer to processes where entities (such as cryptographic devices) perform cryptographic operations on behalf of other entities (e.g., client computers). For example, cryptographic devices can encrypt data such as sensitive medical records on behalf of a client computer associated with a hospital. At a later time when the client computer wants to retrieve the encrypted data, the client computer may communicate with the cryptographic devices in order to decrypt the encrypted data. Cryptography as a service may be desirable because cryptographic devices may be better suited than client computers to store sensitive cryptographic information such as secret shares.

One advantage of distributed cryptography is that it is more secure against attacks by cybercriminals. In a standard cryptographic system, a cybercriminal only needs to steal one cryptographic key in order to perform encryption or decryption at will. By contrast, in a distributed cryptographic system, a cybercriminal needs to steal multiple secret shares from multiple cryptographic devices. As a result, it requires more effort on the part of the cybercriminal, and thus the system is more secure.

However, in many distributed cryptographic schemes, all of the secret shares are generated by a single computer system, often referred to as a "trusted external computer." Often, a trusted external computer will generate a secret value (sometimes referred to as a "shared secret" or a "master key") and use the secret value to derive the secret shares before distributing the secret shares to the cryptographic devices. This presents a security vulnerability, as a cybercriminal could simply steal the secret value or the secret shares from the trusted external computer. Using the secret shares or secret value, the cybercriminal can perform encryption or decryption at will. Alternatively, if the trusted external computer is operated by a corrupt or untrustworthy organization, the trusted external computer could use the secret value or secret shares in order to decrypt messages encrypted by the cryptographic devices.

Thus, there is a need for improvements to distributed symmetric cryptography to address the security vulnerability associated with relying on an external computer for secret share generation.

SUMMARY

Embodiments of the present disclosure are directed to methods and systems for generating secret shares and distributing those secret shares to cryptographic devices. The cryptographic devices can later use these secret shares to perform cryptographic operations such as encryption or decryption using threshold distributed symmetric cryptography.

In some methods according to embodiments, the cryptographic devices are initially partitioned into two groups based on the total number of cryptographic devices n and the threshold number t. One group can comprise a number of generating devices. The other group can comprise a number of receiving devices. Each generating device can generate their own secret share, using for example, random sampling. Additionally, each generating device can generate a partial secret share corresponding to each receiving device, and optionally generate a commitment and a honest verifier zero-knowledge proof of knowledge (referred to more generally as a "zero-knowledge proof" or an "HVZK proof").

Each generating device can "blind" (e.g., obscure) their partial secret shares, and then transmit the blinded partial secret shares to the corresponding receiving devices. The generating devices can also transmit their commitments and zero-knowledge proofs to all other cryptographic devices. The receiving devices can combine the received blinded partial secret shares in order to produce their respective secret shares. Further, the cryptographic devices can use the commitments and the zero-knowledge proofs in order to verify that the generating devices behaved honestly and that the receiving device secret shares were generated correctly.

If this process is performed successfully, each cryptographic device can possess their respective secret share. Later, a threshold number of cryptographic devices can use their secret shares to perform distributed symmetric encryption or decryption.

One embodiment is directed to a method performed by a generating device of a plurality of generating devices. The generating device can generate a secret share using a random sampling process, and then generate a plurality of partial secret shares using a plurality of coefficients and the secret share. The plurality of partial secret shares can corresponding to a plurality of receiving devices, wherein a plurality of cryptographic devices includes the plurality of generating devices and the plurality of receiving devices. The generating device can generate a blinding value using a plurality of seed values and a pseudorandom function, then generate a plurality of blinded partial secret shares by adding the blinding value to each partial secret share of the plurality of partial secret shares. The generating device can then transmit each blinded partial secret share of the plurality of blinded partial secret shares to a corresponding receiving device of the plurality of receiving devices. Each receiving device can combine a respective blinded partial secret share of the plurality of blinded partial secret shares and one or more other blinded partial secret shares received from one or more other generating devices of the plurality of generating devices. In this way, each corresponding receiving device of the plurality of receiving devices can thereby generating a corresponding receiving device secret share.

Another embodiment is directed to a method comprising performed by a receiving device. The receiving device can receive a plurality of blinded partial secret shares from a plurality of generating devices, each blinded partial secret share of the plurality of blinded partial secret shares corresponding to a different generating device of the plurality of generating devices. The receiving device can then generate a secret share by combining the plurality of blinded partial secret shares. The receiving device can additionally receive a plurality of commitments and a plurality of zero-knowledge proofs from the plurality of generating devices. The receiving device can generate a receiving device commitment based on the secret share, then verify that the receiving device commitment is consistent with the plurality of commitments. Additionally, the receiving device can verify the plurality of zero-knowledge proofs using the plurality of commitments. Further, the receiving device can a plurality of confirmation values from a plurality of confirming devices and verify that the plurality of confirmation values are equivalent.

These and other embodiments of the disclosure are described in detail below. For example, other embodiments are directed to systems, devices, and computer readable media associated with methods described herein.

Prior to discussing specific embodiments of the disclosure, some terms may be described in detail.

Terms

A "server computer" may include a powerful computer or cluster of computers. For example, the server computer can include a large mainframe, a minicomputer cluster, or a group of servers functioning as a unit. In one example, the server computer can include a database server coupled to a web server. The server computer may comprise one or more computational apparatuses and may use any of a variety of computing structures, arrangements, and compilations for servicing the requests from one or more client computers A "memory" may be any suitable device or devices that may store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

The term "cryptographic key" may refer to data used to perform encryption or decryption. For example, a cryptographic key may refer to a product of two large prime numbers. A cryptographic key may be used in a cryptosystem such as RSA (Rivest, Shamir, Adleman) or AES (Advanced Encryption Standard), and may be used to encrypt plaintext and produce a ciphertext output, or decrypt ciphertext and produce a plaintext output. Cryptographic keys may be symmetrical, in which case the same key is used for encryption and decryption, or asymmetrical, in which case different keys are used for encryption and decryption.

The term "session key" may refer to a cryptographic key used to perform encryption or decryption during a particular "session." A session may include a limited and/or defined period of time or use. For example, a session may comprise a 15 minute period, 10 encryption operations, a single decryption operation, etc.

The term "bulk key" may refer to data used in encryption or decryption. A bulk key may be used to generate one or more "message keys," which can be used to encrypt or decrypt messages corresponding to those message keys.

The term "plaintext" may refer to text that is in unencrypted or plain form. For example, this may refer to text that can be interpreted by a human or a computer without any processing, such as the phrase "hello, how are you?" Numbers or other symbols may also qualify as plaintext.

The term "ciphertext" may refer to text that is in an encrypted form. For example, this could refer to text that must be decrypted before it can be interpreted by a human or computer. Ciphertexts may be generated using any cryptographic algorithm or cryptosystem, such as RSA or AES.

A "client computer" may refer to a computer that uses the services of other computers or devices, such as server computers. A client computer may connect to these other computers or devices over a network such as the Internet. As an example, a client computer may comprise a laptop computer that connects to an image hosting server in order to view images stored on that image hosting server.

A "cryptographic device" may refer to any device that may perform cryptographic operations, including encryption and decryption. A cryptographic device may participate in distributed or multi-party cryptography. Examples of cryptographic devices include server computers, hardware security modules, desktop computers, laptops, smartphones, smart watches, or other portable electronic devices. A cryptographic device may possess a "secret," or "secret share."

A "proxy device" may refer to a device that acts as a proxy. A proxy device may perform operations on behalf of other devices. For example, a proxy device may receive and transmit messages or other data on behalf of other devices. A proxy device that acts to route communications between other devices in a network of devices may be referred to as a "hub device."

A "numeric identifier" may refer to a number that can be used to identify something, such as a cryptographic device. Mathematical operations, such as addition, subtraction, equality and inequality comparison, etc. may be applied to numeric identifiers.

The term "multi-party computation" may refer to a computation that is performed by multiple parties. Each party, such as a computer, server, or cryptographic device, may have some inputs to the computation. Each party can collectively calculate the output of the computation using the inputs.

The term "secure multi-party computation" may refer to a multi-party computation that is secure. In some cases, "secure multi-party computation refers to a multi-party computation in which the parties do not share information or other inputs with each other. An example is Yao's Millionaires' problem, in which two millionaires want to determine which one is more wealthy without revealing their wealth to one another.

A "secret value" or "secret" may refer to a value or thing kept hidden as part of a cryptographic process. The security of the cryptographic process may rely on the secret value remaining secret. A secret may include a cryptographic key or a "secret share." Exposure of the secret may allow parties other than the intended parties to encrypt or decrypt messages.

A "shared secret" may refer to a secret value or thing shared between multiple parties. For example, a shared secret may be a cryptographic key, divided up such that multiple parties each possess a fraction of that cryptographic key. As an example, two parties may each possess 64 bits of a shared secret comprising a 128 bit cryptographic key.

A "secret share" may refer to a value derived from a shared secret. As an example, a secret share may comprise the first 64 bits of a 128 bit secret value. A secret share may also comprise a secret value combined with a number or other data. In some cases, multiple secret shares may be combined to reproduce a shared secret.

A "hash function" may refer to any function that can be used to map data of arbitrary length or size to data of fixed length or size. A hash function may be used to obscure data by replacing it with its corresponding "hash value." Hash functions may be used to generate "commitments" or "commitment messages" data that may be used to evaluate the integrity of encrypted data.

A "commitment" or "commitment message" may refer to data that may be used to verify that a course of action has been committed to. In the context of cryptography, a commitment may refer to a message that may be used to verify that an encrypted message was not tampered with. Before a message is encrypted, a commitment can be produced based on the message, e.g., via a hash function. This commitment can be sent alongside the encrypted message. Once the message is decrypted, the recipient can generate its own commitment message using the same hash function. The received commitment message and the generated commitment message can be compared to verify the integrity of the encrypted message.

A "pseudorandom function" may refer to a deterministic function that produces an output that appears random. Pseudorandom functions may include collision resistant hash functions and elliptic curve groups. A pseudorandom function may approximate a random oracle, an ideal cryptographic primitive that maps an input to a random output from its output domain. A pseudorandom function can be constructed from a pseudorandom number generator.

A "nonce" or "cryptographic nonce" may refer to a value (e.g., a number) that may be used in a cryptographic process, preferably a limited number of times. A nonce may be derived wholly or in part from other data, such as hash values or commitments. A "random nonce" may comprise a number that has been randomly or pseudorandomly generated, and may be used in conjunction with cryptographic hash functions. Use of a random nonce may prevent some forms of cryptographic attacks, such as the "replay attack."

The "order" of a mathematical group may refer to the number of elements in that group. A "prime order" may refer to an order that is also prime. A "prime order value" may refer specifically to the data or value associated with a prime order.

The "generator" of a mathematical group may refer to a value that can be used to generate each element in the group.

The term "bilinear pairing" may refer to a function that maps inputs from two mathematical groups to a third mathematical group. A bilinear pairing e is bilinear (that is $\forall a, b \in \mathbb{Z}: e(aP, bQ) = e(P,Q)^{ab}$), non-degenerate, and can be computed in an efficient manner. The Weil pairing and the Tate pairing are examples of bilinear pairings.

A "honest verifier zero-knowledge proof of knowledge" (also referred to as an HVZK proof) may refer to a zero-knowledge proof of knowledge performed by an honest verifying entity. An honest verifying entity is an entity (e.g., a client computer) that participates in a cryptographic protocol non-maliciously (e.g., without changing their inputs or outputs) and according to the rules of the protocol. An HVZK proof can be used to verify the legitimacy of information (such as a secret share) without learning anything else about the information.

A "verification value" may refer to data used to verify a computation, fact, or knowledge. An example of a verification value is a non-interactive zero-knowledge proof of knowledge, as discussed above. Another example of a verification value is a cryptographic key. As an example, a private cryptographic key may be used to verify the identity of the person or computer possessing that cryptographic key by signing or encrypting data using that private cryptographic key. A verification value comprising a cryptographic key may be referred to as a "verification key."

A "verification share" may refer to part of a verification value, or data derived from a verification value. A plurality of verification shares may be combined in some manner to produce the corresponding verification value. For example, the product of a collection of verification shares may be equal to the corresponding verification value.

A "confirmation value" may refer to data used to confirm a computation, fact or knowledge. For example, two devices may compare confirmation values in order to confirm that two independently performed computations are equivalent.

A "signature," "digital signature," or "verification signature" may refer to data used to verify the authenticity of data using cryptography. A computer may digitally sign data by encrypting that data using a cryptographic key known only to that computer (i.e., a private key). Other computers may verify the signature by decrypting the data using a publically known cryptographic key corresponding to that computer (i.e., a public key). A verification signature may be used to verify either the source of the signed data or the veracity of the signed data.

A "partial signature" may refer to part of a digital signature. A partial signature, when combined with other partial signatures may reproduce the digital signature. For example, the exclusive-OR of a plurality of partial signatures may be used to reproduce a digital signature.

A "partial computation" may refer to part of a computation. Multiple partial computations may be combined to produce the output of the computation. For example, the volume of multiple solids may comprise partial computations of the total volume of those solids, and those partial computations may be combined via addition. Partial computations may be generated by multiple parties or cryptographic devices participating in a multi-party computation.

A "message" may refer to any data that may be transmitted between two entities. A message may comprise plaintext data or ciphertext data. A message may comprise alphanumeric sequences (e.g., "hello123") or any other data (e.g., image or video files). Messages may be transmitted between computers or other entities A "payload" may refer to information in a transmitted message. A payload may exclude automatically generated metadata. A payload may comprise multiple data elements. For example, a payload corresponding to human vital statistics may comprise three data values corresponding to the weight, height, and age of a human.

A "seed value" may refer to an input to a pseudorandom process. For example, a seed value may be a number such as "12034024." A seed value can enable different entities (such as computers) to produce the same output of the pseudorandom process, provided the same seed value is used.

A "key generation seed" may refer to a seed value or other data used to generate a cryptographic key. For example, a key generation seed may be a number such as "12034024." A key generation seed may be used as the input to a random or pseudorandom function to generate the cryptographic key. Key generation functions may be consistent, that is, identical key generation seeds generate identical cryptographic keys.

A "blinding value" may refer to a value used to "blind" (i.e., obscure) another value or data. A blinding value can comprise a random or pseudorandom value. A blinding value can be combined with another value (e.g., via addition, the exclusive-or function, etc.) in order to obscure the other value.

A "log file" may comprise a data file that stores a record of information. For example, a log file may comprise records of use of a particular service, such as distributed cryptography. A log file may contain additional information, such as a time associated with use of the service, an identifier associated with a client using the service, the nature of the use of the service (for example, whether a client is encrypting or decrypting data), etc.

BRIEF DESCRIPTION OF THE DRAWINGS

FIGS. 4A-4F show a hybrid sequence diagram of an exemplary method of threshold key distribution according to some embodiments.

DETAILED DESCRIPTION

I. Introduction

Figure 1:
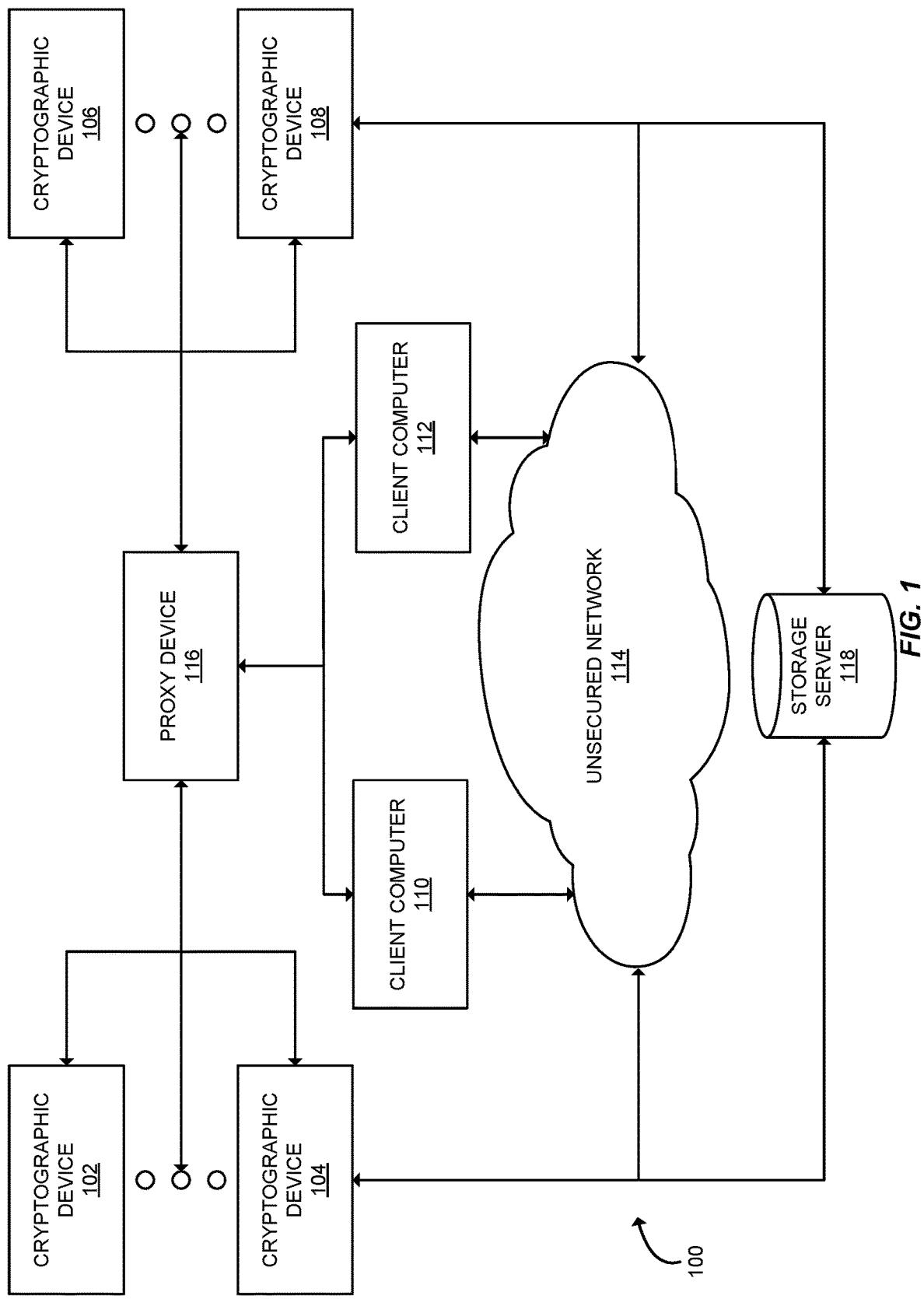
FIG. 1 shows a system block diagram of an exemplary distributed symmetric cryptography system according to some embodiments.

In threshold distributed symmetric cryptography, a threshold number t of participating devices out of n total number of cryptographic devices are needed to perform symmetric cryptographic operations (e.g., encryption or decryption). Such cryptographic schemes can be referred to as "t-out-of-n" distributed symmetric cryptography. If less than a threshold number of cryptographic devices participate, the cryptographic devices cannot encrypt or decrypt data.

Each cryptographic device can participate in threshold distributed symmetric cryptography using one or more secret shares known only to their respective cryptographic device. These secret shares can be used to generate a session key (i.e., a cryptographic key) that can be used to encrypt or decrypt data.

In many applications of distributed symmetric cryptography, a single device or computer system (sometimes referred to as a "trusted computer," a "trusted server," a "trusted external computer," a "trusted external server", or any similar term) generates and distributes the secret shares to the cryptographic devices. Sometimes the trusted external computer uses a secret value or master key to derive the secret shares. The use of a trusted external computer presents a security vulnerability, as a hacker, fraudster, or cybercriminal could exploit the trusted external computer in order to steal the secret shares. Alternatively, if the operator of the trusted external computer is not trustworthy, the operator could save or otherwise store the secret value or secret shares, then use them to decrypt ciphertexts produced by the cryptographic devices, allowing them access to potentially sensitive information.

Embodiments of the present disclosure address this problem by providing for methods and systems that enable the cryptographic devices to collectively generate and distribute their own secret shares. In doing so, the cryptographic devices do not need to rely on a trusted external computer for their secret shares, thus eliminating the aforementioned vulnerability. Consequently, embodiments improve the security of distributed symmetric cryptography.

As stated above, embodiments are directed to methods and systems for generating and distributing secret shares to cryptographic devices in a distributed manner. The cryptographic devices can later use these secret shares to perform threshold distributed symmetric cryptography, enabling data to be encrypted or decrypted provided that at least a threshold number t of cryptographic devices participate. Methods according to embodiments are described in more detail further below with reference to the figures. However, they are also summarized immediately below.

In order to generate the secret shares, the cryptographic devices can be partitioned into two groups based on the threshold number of devices t and the total number of devices n. The first group may be referred to as a "generating device group" comprising t cryptographic devices. The second group may be referred to as a "receiving device group" comprising n-t cryptographic devices. As an example, if the threshold t=7 and the total number of devices n=13, the generating device group may comprise 7 cryptographic devices and the receiving device group may comprise 6 cryptographic devices.

Initially, each generating device can generate its own secret share $sk_i$. The generating devices can generate these secret shares by randomly sampling from an integer interval or using any other appropriate means. Each generating device can also generate a commitment $w_i$ corresponding to their secret share $sk_i$. These commitments can be generated using techniques such as group exponentiation, using a cryptographic scheme such as ElGamal, or any other appropriate method. Additionally, each generating device can generate a zero-knowledge proof $zk_i$. The zero-knowledge proof $zk_i$ can demonstrate or otherwise prove to a verifier (e.g., another cryptographic device), that the generating device possesses the secret share $sk_i$ corresponding to the commitment $w_i$. The subscript "i" indicates that the data value corresponds to or was generated by cryptographic device "i," e.g., commitment $w_3$ corresponds to a cryptographic device "3."

Using their respective secret shares $sk_i$ and a set of coefficients corresponding to the receiving devices $\lambda_{i,j}$ (e.g., Lagrange coefficients), the generating devices can each generate a plurality of partial secret shares $k_{i,j}$ corresponding to the receiving devices. These partial secret shares $k_{1,j}$ can be used by their respective receiving devices to generate respective receiving device secret shares. The subscript "i,j" indicates that the data value corresponds to generating device i and receiving device j. For example, partial secret share $k_{3,5}$ may be generated by generating device "3" and can be used to generate the secret share corresponding to receiving device "5" (i.e., $sk_5$).

However, it may be possible for a malicious receiving device (or a hacker, cybercriminal, etc.) to determine a secret share $sk_i$ used to generate a received partial secret share $k_{i,j}$. In order to prevent this, each generating device can blind its respective partial secret shares $k_{i,j}$ using a blinding value $z_i$ known only to the corresponding generating device.

The blinding values $z_i$ can be generated using a technique known as "zero-sharing," which is described further below with reference to Section IV.A. Using zero-sharing, the blinding values $z_i$ can be random, but subject to the condition that the sum of the blinding values $z_i$ is zero. Each partial secret share $k_{i,j}$ can be blinded using its corresponding blinding value $z_i$ (i.e., corresponding to generating device i) to produce a blinded partial secret share $u_{i,j}$ (e.g., by adding the blinding value $z_i$ to the partial secret share $k_{i,j}$). Because the sum of the blinding values $z_i$ is zero, the sum of the blinded partial secret shares $u_{i,j}$ equals the sum of the partial secret shares $k_{i,j}$. As a result, the receiving devices can use the blinded partial secret shares $u_{i,j}$ to generate their respective secret shares $sk_i$, but the receiving devices cannot use the blinded partial secret shares $u_{i,j}$ to determine the secret share $sk_i$ corresponding to the generating device i.

Once the generating devices have generated their own secret shares $sk_i$, the commitments $w_i$, the zero-knowledge proofs $zk_i$, and the blinded partial secret shares $u_{i,j}$, they can begin transmitting these data to the other cryptographic devices. Each generating device can transmit their generated blinded partial secret shares $u_{i,j}$ to the corresponding receiving devices. The generating devices can also transmit their respective commitments $w_i$ and zero-knowledge proofs $zk_i$ to all other cryptographic devices (including the other generating devices).

Using their respective blinded partial secret shares $u_{i,j}$, the receiving devices can generate their respective secret share $sk_j$. Each receiving device can accomplish this by summing their received blinded partial secret shares $u_{i,j}$ to generate their secret share $sk_j$. After generating their respective secret shares $sk_j$, each receiving device can use their respective secret share $sk_j$ to generate their own commitments $w_j$. Using these commitments $w_j$, the commitments $w_i$, and the coefficients, the receiving devices can verify that their commitments $w_j$ are consistent with the commitments $w_i$ received from the generating devices. In doing so, the receiving devices can confirm the validity of both the secret shares $sk_j$ and the commitments $w_i$. If the commitments $w_j$ are not consistent with the commitments $w_i$, a receiving device can conclude that either their secret share $sk_j$ is not correct or a generating device transmitted an invalid commitment $w_i$. In either case, any receiving device can abort the distributed secret share generation protocol.

Additionally, the cryptographic devices can verify the zero-knowledge proofs $zk_i$ generated by the generating devices. In doing so, the cryptographic devices can verify that the generating devices actually possess their stated secret shares $sk_i$. If the zero-knowledge proofs $zk_i$ fail to verify, any cryptographic device can abort the distributed secret share generation protocol.

As an additional security check, a plurality of confirming devices can also each generate a respective confirmation value $a_i$ by combining the commitments $w_i$ received from the generating devices (e.g., by concatenating and hashing the commitments $w_i$). The confirming devices can then transmit their respective confirmation values $a_i$ to all other cryptographic devices. Each cryptographic device can verify that the confirmation values $a_i$ generated by the confirming devices are equivalent. In doing so, the cryptographic devices can confirm that each cryptographic device received the same commitments $w_i$ from the generating devices and the same confirmation values $a_i$ from all cryptographic devices.

The plurality of confirming devices can comprise at least a threshold number of cryptographic devices t. In some embodiments, the plurality of confirming devices may comprise the generating devices. In other embodiments, the plurality of confirming devices may comprise some set of t cryptographic devices. In yet other embodiments, the plurality of confirming devices may comprise all of the cryptographic devices.

If the confirmation values $a_i$ are not all equivalent, any cryptographic device can abort the distributed secret share generation protocol. Otherwise, the cryptographic devices can conclude that the protocol was perform correctly and each cryptographic device can securely store their respective secret share in memory, enabling the cryptographic devices to later use their respective secret shares to perform distributed symmetric cryptographic operations.

II. Distributed Symmetric Cryptography Overview

Embodiments of the present disclosure are directed to methods and systems used to generate and distribute secret shares that can be used by cryptographic devices to perform distributed symmetric cryptography. In order to provide context for these embodiments, distributed symmetric cryptography and some related concepts are described below.

Distributed symmetric cryptography can be implemented, in part, using distributed pseudorandom function. A distributed pseudorandom function is a function that can be calculated in a distributed manner (e.g., by multiple participating cryptographic devices) and produces consistent outputs that appear random. The use of distributed pseudorandom functions allow the cryptographic devices to use their secret shares to produce a session key that can be used to perform encryption or decryption without revealing their secret shares in the process.

Cryptographic devices that perform distributed symmetric cryptography may each possess one or more secret shares. In some implementations of distributed symmetric cryptography, these secret shares can be derived from secret values. Alternatively, the secret shares can be generated without derivation from secret values, as described herein with reference to FIGS. 4A-4F.

During the execution of a distributed pseudorandom function, the cryptographic device can use their respective secret shares and one or more input values to generate partial computations. These one or more other input values can comprise, for example, a commitment or hash of a message m that an "initiating device" intends to encrypt. The initiating device could comprise, for example, a client computer that communicates with the cryptographic devices as part of an external cryptography service provided by the cryptographic devices. As an alternative, the initiating device could comprise a cryptographic device that requests the assistance of other cryptographic devices to perform encryption or decryption.

After generating the partial computations, the cryptographic devices can transmit the partial computations to the initiating device. The initiating device can combine these partial computations to calculate the output of the distributed pseudorandom function. In distributed symmetric cryptography, the output could comprise, for example, a session key. As an alternative, the output could comprise a key generation seed that can be used by the initiating device to generate the session key, using, for example, an AES key generation algorithm. The session key can be used to perform encryption or decryption. Alternatively, in "amortized" distributed symmetric cryptography (a variation on distributed symmetric cryptography), a "bulk" session key can be used to derive a plurality of individual "message keys" that can be used to encrypt individual messages.

The following subsections describe concepts and techniques that can be used to implement distributed symmetric cryptography in more detail.

A. Secret Shares

As stated above, cryptographic devices may possess secret shares that can be used to generate session keys, which in turn can be used to perform cryptographic operations. Secret shares can correspond to particular secret sharing schemes. One example is Shamir's secret sharing (which is described in more detail below), other examples include Blakley's scheme, or secret sharing based on the Chinese Remainder Theorem. Some secret sharing schemes are threshold or "t-out-of-n" secret sharing. In the context of secret sharing, t-out-of-n usually indicates that any t secret shares, out of a total of n secret shares are needed to reproduce a "secret value" or "shared secret."

In Shamir's secret sharing, a secret value S corresponds to the coefficients of a polynomial $P(x)=a_0+a_1x+a_2x^2+ \ldots +a_kx^k$. In some implementations, the secret value is encoded into a particular coefficient, such as the zeroth order coefficient $a_0$, i.e., by setting the value of $a_0$ to the secret value S. The value of the other coefficients (i.e., $a_1$ to $a_k$) can be set in any appropriate manner (e.g., randomly). If the secret value S is encoded into $a_0$, the polynomial $P(x)$ evaluated at $x=0$ is equal to the shared secret, i.e., $P(0)=a_0=S$.

In Shamir's secret sharing, secret shares can be generated from the polynomial $P(x)$ by evaluating the polynomial at distinct values of x to produce distinct points (paired x, $P(x)$ values). These points can be distributed to cryptographic devices and used as secret shares. One technique that can be used to sample secret shares involves using unique serial numbers or device identifier corresponding to particular cryptographic devices as values of x. As an example, a cryptographic device with serial number "18723" may receive a secret share $sk_{18723}=(18723, P(18723))$, while a cryptographic device with a serial number "99123" may receive a secret share $sk_{99123}=(99123, P(99123))$.

Notably, however, it is not required to produce secret shares in a Shamir's secret sharing scheme using the sequence of steps outlined above. These steps are meant only to characterize a typical approach that can be used to implement Shamir's secret sharing. Embodiments of the present disclosure use a different sequence of steps.

Rather than beginning with the secret value S and polynomial $P(x)$, then sampling the polynomial $P(x)$ to produce the secret shares $sk_i$, the following approach can be used. The secret shares $sk_i$ can be first be generated, then from the secret shares the polynomial $P(x)$ can be determined, then from the polynomial $P(x)$ a secret value S can be identified. As an example, cryptographic devices can generate random numbers r to use as secret shares. A cryptographic device with serial number "18723" can generate a secret share comprising $sk_{18723}=(18723, r_{18723})$ while a cryptographic device with serial number "99123" can generate a secret share $sk_{99123}=(99123, r_{99123})$. Provided the secret shares are unique, for any k+1 secret shares (where k is the degree of a polynomial $P(x)$), a polynomial $P(x)$ exists that intersects those secret shares. The secret value S can be taken as one of the coefficients of this polynomial, i.e., $a_0$.

Later, if necessary, the secret value can be obtained from the secret shares by interpolating the polynomial using the secret shares. Lagrange interpolation (described further below) is one method that can be used. Once the polynomial $P(x)$ is determined via interpolation, it can be evaluated at a particular value of x (e.g., x=0) in order to determine the secret value S.

As an aside, because the secret shares comprise points on a polynomial (of which there are infinite), Shamir's secret sharing can provide for an arbitrarily large number of secret shares for any given threshold t. This means that networks of cryptographic devices can possess an arbitrarily large number of cryptographic devices for any given threshold. This makes it comparatively easy to add cryptographic devices to a cryptographic device network that uses Shamir's secret sharing scheme.

As a further aside, in some implementations of distributed symmetric cryptography, cryptographic devices can possess multiple secret shares. For example, if a cryptographic device possesses two secret shares, the first secret share could be generated by sampling from a first polynomial (encoding a first secret value $S_1$) and the second secret share could be generated by sampling from a second polynomial (encoding a second secret value $S_2$). Rather than using a single secret share in order to generate a partial computation (which can in turn be used to generate a session key), a cryptographic device can use two secret shares. This may make it more difficult for a hacker or other malicious user to determine the secret shares corresponding to a particular partial computation.

B. Verification Shares

Optionally, each cryptographic device can possess a verification share. Much like a secret share, a verification share can be used as an input to a distributed pseudorandom function. However, rather than being used to generate cryptographic keys, verification shares can be used to generate partial signatures, which can in turn be combined to generate verification signatures. Verification signatures may comprise cryptographic signatures that can be used to verify that a distributed symmetric encryption process was performed correctly.

Further, in some implementations of distributed symmetric cryptography, verification signatures can be used to determine whether an initiating device (e.g., a client computer) is performing an encryption operation or a decryption operation. Thus verification signatures can be used in part of a ciphertext accountability scheme. For example, a verification signature may be generated by an initiating device during a distributed symmetric encryption operation. During a distributed symmetric decryption operation, the initiating device may need to present the verification signature to the cryptographic devices. If the initiating device does not present a valid verification signature, the cryptographic devices may not participate in decryption. In this way, the cryptographic devices can determine whether the initiating device is performing encryption or decryption, as well as generally control access to the distributed symmetric cryptography system. In some distributed symmetric cryptography systems, the cryptographic devices may record access to the distributed symmetric cryptography system in a log file. This record may indicate whether the initiating device presented a valid verification signature.

Verification shares may correspond to a verification value, much like secret shares correspond to a secret value. This verification value may be encoded into a polynomial, much like how a secret value can be encoded into a polynomial. The verification value may be reproduced using a threshold number of verification shares and a technique such as Lagrange interpolation. A verification value may correspond to a cryptographic key, such as a private cryptographic key that has a corresponding public (verification key). Using a threshold number of verification shares and a distributed pseudorandom function, cryptographic devices may perform an operation that is equivalent to signature generation using the private cryptographic key, thereby generating a verification signature. The verification signature can be verified at a later time using the corresponding verification key.

C. Lagrange Interpolation

Lagrange interpolation is an interpolation technique that can be used to determine a polynomial P(x) using a set of points (i.e., paired values x, P(x)) corresponding to the polynomial. Lagrange interpolation can be used in part of a secret sharing scheme, such as Shamir's secret sharing, which can in turn be used to implement distributed symmetric cryptography. Additionally, Lagrange interpolation can be used as part of a secret share distribution process, as described in further detail below in Section IV. The Lagrange form of a polynomial is given by the following formula:

$$P(x) = \sum_{k=0}^{k} P(x_i) l_i(x) \qquad (1)$$

Where $l_i(x)$ is the $i^{th}$ Lagrange basis polynomial (e.g., corresponding to the $i^{th}$ secret share) and k is the order of the polynomial P(x). The Lagrange basis polynomial $l_i(x)$ is defined by the following formula:

$$l_i(x) = \Pi_{\substack{0 \le p \le k \\ p \ne i}} \frac{x - x_p}{x_i - x_p} \qquad (2)$$

Where $x_i$ is the x value corresponding to the $i^{th}$ secret share (or verification value) and $x_p$ is the x value of the $p^{th}$ secret share (or verification value).

Because P(0) equals the zeroth order coefficient $a_0$, if the secret value or verification value S is encoded into $a_0$, the preceding formulas can be simplified by substituting x=0:

$$\lambda_i = l_i(0) := \Pi_{\substack{0 \le p \le k \\ p \ne i}} \frac{-x_p}{x_i - x_p} \qquad (3)$$

$$S = a_0 = \sum_{k=0}^{k} P(x_i) \lambda_i \qquad (4)$$

Notably, the Lagrange coefficients $\lambda_i$ are dependent only on the values of x corresponding to the cryptographic devices. As stated above, these values of x may comprise unique serial numbers or identification numbers (sometimes referred to as numeric identifiers) corresponding to each cryptographic device, and thus may be known prior to distributed symmetric cryptography or secret share generation. Thus the Lagrange coefficients $\lambda_i$ corresponding to each cryptographic device can be pre-calculated.

Further, because the Lagrange coefficients $\lambda_i$ are independent of any polynomial P(x), a single Lagrange coefficient can be used for multiple distinct polynomials $P_1(x)$ and $P_2(x)$. As a result, a single Lagrange coefficient L can correspond to a cryptographic device possessing any number of secret shares derived from any number of distinct secret values.

Because of these properties, Lagrange interpolation can be used to implement Shamir's secret sharing. As long as k+1 secret shares $sk_i=(x_i, P(x_i))$ and corresponding Lagrange coefficients $\lambda_i$ are known, the secret value S (or a verification value) can be calculated using the above formula. Additionally, Lagrange interpolation can be used to implement methods of secret share distribution according to some embodiments.

Lagrange interpolation can also be used to generate and distribute secret shares to cryptographic devices. Rather than using equation (1) to calculate the value of $P(0)=a_0=S$, equation (1) can be modified to calculate the value of a secret share corresponding to cryptographic device j:

$$P(x_j) = \sum_{k=0}^{k} \lambda_{i,j} P(x_i) \text{ where } \lambda_{i,j} = l_i(x_j). \qquad (5)$$

If the secret shares corresponding to cryptographic devices i (i.e., $x_i$, $P(x_i)$) are known, those cryptographic devices can use Lagrange interpolation (e.g., via equation (5)) to calculate the secret share $x_j$, $P(x_j)$ corresponding to a cryptographic device. As described in Section IV, this property allows a group of generating devices to generate their own secret shares, then use those secret shares to generate partial secret shares. The partial secret shares can be distributed to a group of receiving devices and the receiving devices can use the partial secret shares to generate their own respective secret shares.

In a non-ideal implementation of a distributed threshold cryptography system, the secret value S could correspond to a cryptographic key. A threshold number of cryptographic devices t=k+1 could collectively use their secret shares $sk_i$ to determine the secret value S, which could subsequently be used to encrypt or decrypt data. However, exposing the secret value S in this way may be undesirable, as it may present an opportunity for hackers or cybercriminals to acquire the secret value S. Instead, the secret shares $sk_i$ can be used as an input to a distributed pseudorandom function as described in the following subsection. This protects both the secret value S and the secret shares $sk_i$ from being discovered by malicious entities.

D. Pseudorandom and Distributed Pseudorandom Functions

A pseudorandom function is a function that produces an output that appears random with respect to the input. The advantage of using pseudorandom functions is that it is difficult to determine the input given the output, and thus pseudorandom functions can be used to obscure inputs.

In a hypothetical cryptographic application, a secret value S could comprise a cryptographic key. The secret value S could be used to encrypt or decrypt data, when and if it is reconstructed from its constituent secret shares $sk_0$, $sk_i$, . . . , $sk_t$. However, this may be undesirable because the secret value S could be stolen and used by a malicious participant after it is reconstructed. Instead, it may be preferable to use the secret value S as an input to a pseudorandom function, then use the output of the pseudorandom function to generate a cryptographic key. In this way the secret value S is not exposed to an attacker or other malicious user.

A distributed pseudorandom function may refer to a pseudorandom function that can be calculated in a distributed manner. As an example, a plurality of cryptographic devices may use their respective secret shares $sk_i$ to calculate a plurality of partial computations. These partial computations may be combined to produce the output of a pseudorandom function. The combination of those partial combinations may be equivalent to the output of a corresponding non-distributed pseudorandom function (e.g., one where a single cryptographic device directly produces the output of a pseudorandom function).

Any pseudorandom function that appears random and is consistent can be used as the basis for a distributed pseudorandom function. Notable examples of pseudorandom functions are hash functions, the advanced encryption standard (AES) cryptosystem and elliptic curve cryptosystems. Elliptic curve cryptography will be described below for the purpose of illustrating some embodiments, however, it should be understood that embodiments can be practiced with any appropriate pseudorandom function.

An elliptic curve is any curve satisfying the equation $y^2=x^3+ax+b$. Elliptic curve cryptography is usually performed using elliptic curves over finite fields. An example of a finite field is integers mod p, where p is a prime number. Integers mod p comprises every integer from 0 to p−1. An elliptic curve group may be defined by its order q, the number of elements within the group. The decisional Diffie-Hellman assumption holds under these elliptic curve groups.

Elliptic curve cryptosystems, like many other cryptosystems, relies on mathematical problems which have computationally infeasible solutions. With elliptic curve cryptography, there is currently no efficient solution to the "elliptic curve discrete logarithm problem." Given an original point A on an elliptic curve and a product point C on an elliptic curve, it is sufficiently difficult to determine a multiplicand point B, such that the point multiplication A*B=C holds. A practical result is that as long as B is kept secret, a message can be converted into a point A and point-multiplied with a point B in order to produce a product point C.

The decisional Diffie-Hellman assumption states that in a multiplicative group G of prime order p with generator g, that for random and independent a and b, the values $g^a$, $g^b$ and $g^{ab}$ all appear to be random elements selected from the group G. In other words, it is difficult to determine the multiplicative relationship between $g^a$, $g^b$ and $g^{ab}$ (i.e., that $g^{ab}$ equals the product of $g^a$ and $g^b$).

Practically, two points on an elliptic curve can be multiplied to produce a third point, and the relationship between the two points and the third point appears random. So if some value can be represented as a point, that value can be point multiplied by another value to produce a third value, and the relationship between those three values appears random. Thus elliptic curves can be used as a pseudorandom functional basis for distributed pseudorandom functions.

E. Bilinear Pairing

Some implementations of distributed symmetric encryption can use pairing-based cryptography, particularly bilinear pairings, to generate message keys used to encrypt messages or decrypt corresponding ciphertexts. After deriving a bulk key using a distributed pseudorandom function, an initiating device (e.g., a client computer) can use the bulk key to derive a message key using a bilinear pairing. This message key can then be used to encrypt a message. Likewise, during decryption, an initiating device can use a bilinear pairing to generate a nonce that can be used as the input to the distributed pseudorandom function to generate a message key. This message key can be used to decrypt a corresponding ciphertext.

A bilinear pairing $e: G_0 \times G_1 \rightarrow G_T$ maps inputs from two groups $G_0$ and $G_1$ to a third group $G_T$. In amortized distributed symmetric cryptography, these groups may comprise multiplicative cyclic groups of prime order p in which the Decisional Diffie-Hellman assumption holds. This bilinear pairing e may be effectively computable and non-degenerate.

For a bilinear pairing e, and for any P in $G_0$ and Q in $G_1$: $e(aP, bQ)=e(P,Q)^{ab}$. This property enables consistent message keys to be generated either from a bulk key (generated from a distributed pseudorandom function) or directly via a distributed pseudorandom function. As such, an initiating device can derive multiple message keys during encryption of multiple messages, and derive a single message key during decryption of ciphertext.

As an example, an initiating device can derive a bulk key bk using a distributed pseudorandom function with a hash of an initiating device identifier $H_0(id)$ as the input, where $H_0$ is a hash function that maps an input to $G_0$. Then the bulk key $bk=H_0(id)^S$ can be generated, where S is the secret value used to derive secret shares $sk_0, \ldots, sk_n$. The initiating device can calculate a message key mk corresponding to a message $m_i$ using a bilinear pairing of the bulk key bk and a hash of a commitment of a message and a random value $h_i=Com(m_i\|r_i)$, that is, $H_1(h_i)$, where $H_1$ is a hash function that maps an input to $G_1$. Then $mk=e(H_0(id)^S, H_1(h_i))=e(H_0(id),H_1(h_i))^S$ (by the bilinearity property above). The message key mk can then be used to encrypt the message $m_i$ to produce ciphertext $c_i$. This ciphertext $c_i$ can be stored, e.g., in a storage server for later decryption.

Later, the initiating device can retrieve the ciphertext $c_i$ and communicate with the cryptographic devices to perform distributed pseudorandom decryption on the ciphertext $c_i$. Rather than transmit the hash of the client identifier $H_0(id)$ to the cryptographic devices, the initiating device can transmit a nonce p comprising a bilinear mapping of the hash of the client identifier $H_0(id)$ and the hash of the commitment $H_1(h_i)$ to the cryptographic devices, that is: $\mu=e(H_0(id),H_1(h_i))$ Then the result of the distributed pseudorandom function is $\mu^S=e(H_0(id),H_1(h_i))^S=e(H_0(id)^S,H_1(h_i))=mk$. The message key mk can then be used to decrypt the ciphertext $c_i$ to produce the message $m_1$. In this way, bilinear pairings can be used to derive consistent symmetric message keys used to encrypt messages and decrypt ciphertext. Further details of bilinear pairings can be found in U.S. Patent Application No. PCT/US2021/029429, which is incorporated by reference in its entirety for all purposes.

F. Implementing Distributed Symmetric Cryptography

This subsection describes how some of the concepts listed above can be combined to perform distributed symmetric cryptography. Cryptographic devices can use elliptic curve cryptography in a distributed matter to encrypt data values using their respective secret shares $sk_i$. A data value could comprise, for example, a commitment H(m) comprising a hash of a message m that the initiating device intends to encrypt, or a commitment H(id) comprising a hash of an identifier corresponding to the initiating device. In some embodiments, multiple commitments (e.g., $H_1(m)$, $H_2(m)$) can be encrypted. These encrypted commitments may be referred to as "partial computations." These partial computations can be combined by the initiating device to generate a value that is equivalent to the commitment encrypted using the secret value S, which can be used as a session key by the initiating device to encrypt a message m. Alternatively, the partial computations can be combined by the initiating device to generate a bulk key bk, which can subsequently be used to generate message keys used to encrypt individual messages, using, for example, a bilinear pairing as described further below.

The term $H_n(m)^{S_n}$ may be used to represent the $n^{th}$ commitment $H_n(m)$ encrypted using the $n^{th}$ secret value $S_n$ using elliptic curve cryptography (e.g., the first commitment encrypted using the first secret value or the second commitment encrypted using the second secret value). The term $H_n(m)^{s_{n,i}}$ may be used to represent the partial computation comprising the $n^{th}$ commitment $H_n(m)$ encrypted using the $i^{th}$ secret share corresponding to the $n^{th}$ Commitment $s_{n,i}$. In elliptic curve cryptography, $H_n(m)^{S_n}$ is equivalent to point multiplying the $n^{th}$ commitment $H_n(m)$ by itself $S_n$ times, and the partial computation $H_n(m)^{s_{n,i}}$ is equivalent to point multiplying the $n^{th}$ Commitment $H_n(m)$ by itself $s_{n,i}$ times. Each hash function $H_n$ may map the input to different sets of output values, such as different additive or multiplicative cyclic groups. For example, a first hash function $H_0$ can map an input to a multiplicative cyclic group $G_0$, i.e., $H_0$: $\{0,1\}^* \rightarrow G_0$, a second hash function $H_1$ can map an input to a multiplicative cyclic group $G_1$, i.e., $H_1$: $\{0,1\}^* \rightarrow G_1$, etc.

The relationship between $H(m)^{Sn}$ and $H_n(m)^{s_{n,i}}$ can be shown using the formula below:

$$H_n(m)^{S_n} = H_n(m)^{\sum_{i=1}^{t} s_{n,i} \lambda_i} = \prod_{i=1}^{t}(H_n(m)^{s_{n,i}})^{\lambda_i} \quad (6)$$

Where $s_{n,i}$ is the $i^{th}$ secret share corresponding to the $n^{th}$ secret value and $\lambda_i$ is the $i^{th}$ Lagrange coefficient corresponding to the $i^{th}$ cryptographic device (see formula (3)). Thus, the $n^{th}$ commitment encrypted using the $n^{th}$ secret value $S_n$ (i.e., $H_n(m)^{Sn}$) is equal to the product of the $n^{th}$ commitment encrypted using the secret shares and exponentiated using the Lagrange coefficients $(H_n(m)^{s_{n,i}})^{\lambda_i}$. This illustrates one way in which Shamir's secret sharing and elliptic curve cryptography can be used together to implement distributed pseudorandom functionality.

Further, because one set of Lagrange coefficients can be used for any number of polynomials, partial computations corresponding to different commitments and secret shares can be combined prior to calculating the distributed pseudorandom function. For example, a first partial computation and a second partial computation can be combined by calculating the product of the two partial computations:

$$H_1(m)^{s_{1,i}} * H_2(m)^{s_{2,i}} \quad (7)$$

Where $H_1(m)^{s_{1,i}}$ is the first commitment encrypted using the first secret share corresponding to the $i^{th}$ cryptographic device, and $H_2(m)^{s_{2,i}}$ is the second commitment encrypted using the second secret share corresponding to the $i^{th}$ cryptographic device.

Substituting this combination for the partial computation $H_n(m)^{s_{n,i}}$ in equation (6) produces:

$$\prod_{i=1}^{t}(H_1(m)^{s_{1,i}} * H_2(m)^{s_{2,i}})^{\lambda_i} = \prod_{i=1}^{t} H_1(m)^{\lambda_i s_{1,i}} * H_2(m)^{\lambda_i s_{2,i}}$$

$$\prod_{i=1}^{t} H_1(m)^{\lambda_i s_{1,i}} * H_2(m)^{\lambda_i s_{2,i}} = \prod_{i=1}^{t} H_1(m)^{\lambda_i s_{1,i}} * \prod_{i=1}^{t} H_2(m)^{\lambda_i s_{2,i}}$$

$$\prod_{i=1}^{t} H_1(m)^{\lambda_i s_{1,i}} * \prod_{i=1}^{t} H_2(m)^{\lambda_i s_{2,i}} = H_1(m)^{s_1} * H_2(m)^{s_2}$$

Thus the output of the distributed pseudorandom function with multiplied partial computation inputs (e.g., as in equation (7)) is equivalent to the product of the partial computation outputs. Further, the first secret value $S_1$ and the second secret value $S_2$ are obscured by this product. Knowing the value of the first commitment $H_1(m)$, the second commitment $H_2(m)$, and the product $H_1(m)^{S_1} * H_2(m)^{S_2}$ is not sufficient to determine the first secret value $S_1$ or the second secret value $S_2$, as there are an infinite number of $S_1$, $S_2$ pairs that could produce the product given the first commitment and the second commitment. In this way the secret values and secret shares are protected even from adaptive attackers.

In some implementations of distributed symmetric cryptography, an initiating device can use the output of the distributed pseudorandom function to generate a session key that can be used for encryption and decryption. Provided consistent commitments are used for encryption and decryption, the same cryptographic key can be generated and used for encrypting messages and decrypting corresponding ciphertext.

To summarize, each cryptographic device can possess one or more secret shares. A threshold number of cryptographic devices can participate in a multi-party cryptographic operation. An initiating device may possess one or more messages $m_1, \ldots, m_n$ that the initiating device wants to encrypt. The initiating device can generate a commitment of either a message m or a client identifier id, and transmit it to the cryptographic devices. The cryptographic devices can subsequently generate partial computations corresponding to this commitment and transmit them back to the initiating device. The initiating device can combine these partial computations to produce the output of the distributed pseudorandom function. The output of the distributed pseudorandom function can then be used by the initiating device to derive one or more cryptographic keys.

In "adaptive attack resistant" distributed symmetric cryptography (so called because it provides extra protection against adaptive cryptographic attacks), an initiating device may possess a single message m. The initiating device can generate two commitments of the message m using two distinct hash function $H_1(m)$ and $H_2(m)$, and transmit the commitments to the participating cryptographic devices. The participating cryptographic devices may each use their corresponding secret shares $s_{1,i}$ and $s_{2,i}$ to encrypt the commitments $H_1(m)$ and $H_2(m)$. In this way each cryptographic device produces a first partial computation $H_1(m)^{s_{1,i}}$ and a second partial computation $H_2(m)^{s_{2,i}}$. The cryptographic devices may combine their respective first and second partial computations (e.g., by calculating the product $H_1(m)^{s_{1,i}} * H_2(m)^{s_{2,i}}$) to produce a respective partial computation.

Subsequently, the participating cryptographic devices may transmit the plurality of partial computations $H_1(m)^{s_{1,i}} * H_2(m)^{s_{2,i}}$ to the initiating device. The initiating device may determine Lagrange coefficients $\lambda_i$ corresponding to the plurality of partial computations $H_1(m)^{s_{1,i}} * H_2(m)^{s_{2,i}}$. The initiating device may exponentiate the plurality of partial computations with their corresponding Lagrange coefficients $\lambda_i$ to produce a plurality of intermediate computations. The initiating device may combine the intermediate computations by calculating their product. The product of the intermediate calculations may be equivalent to the products of the first commitment $H_1(m)$ and the second commitment $H_2(m)$ encrypted using the first secret value and the second secret value respectively (i.e., $H_1(m)^{S_1} * H_2(m)^{S_2}$). The product of the intermediate calculations may be used as a key generation seed in order to generate a session key. The session key may be used to encrypt the initiating device's message m and produce a ciphertext. When the ciphertext is to be decrypted, the same process may occur and the same cryptographic key may result. The ciphertext may be decrypted with the session key, thereby generating the message m.

In some implementations of distributed symmetric cryptography, verification signatures can be produced using similar methods. An initiating device may transmit a commitment $H_n(m)$ (or multiple commitments) of a message m to a plurality of cryptographic devices. The plurality of cryptographic devices may use elliptic curve cryptography to encrypt the commitment $H_n(m)$ using each of their respective verification shares to produce a plurality of partial signatures. The plurality of cryptographic devices may transmit the plurality of partial signatures to the initiating device. The initiating device may determine a plurality of Lagrange coefficients $\lambda_i$ corresponding to the plurality of partial signatures, then exponentiate each partial signature using its corresponding Lagrange coefficient to produce a plurality of intermediate signatures. The initiating device may generate a verification signature as the product of the plurality of intermediate signatures. The verification signature may be equivalent to the commitment $H_n(m)$ encrypted using the verification value. In some implementations, partial signatures may be produced with only a single commitment, such as the first commitment or the second commitment. In others, partial signatures may be produced using both a first commitment and a second commitment, analogous to the generation of partial computations described above.

The verification value and a verification key may comprise an asymmetric cryptographic key pair. That is, the verification value may comprise a secret or private cryptographic key, and the verification key may comprise a public cryptographic key, or vis versa. To verify a verification signature, a cryptographic device may decrypt the verification signature using the verification key to produce the first commitment, the second commitment, or a combination thereof. If the resulting commitment matches a commitment received from the initiating device, the verification signature is legitimate.

The preceding example was intended as one non-limiting example of how shared secrets and distributed pseudorandom function may be used to perform distributed symmetric cryptography. Any appropriate pseudorandom function (such as AES, hash functions, etc.) as well as any appropriate secret sharing techniques (e.g., Blakley's scheme, the Chinese Remainder Theorem, etc.) can be used to implement distributed symmetric cryptography.

III. Distributed Cryptographic Network

Distributed symmetric cryptography can be performed by computers, devices, and other systems in a distributed cryptography network. Such a network may include cryptographic devices which can use their secret shares to enable a client computer (or other initiating device) to generate a session key that can subsequently be used to perform encryption or decryption. The cryptographic devices can also communicate with one another in order to collectively generate their respective secret shares. Distributed cryptographic networks are described with reference to FIG. 1 and Section III.A below. Cryptographic devices are described with reference to FIG. 2 and Section III.B below. Client computers are described with reference to FIG. 3 and Section III.C below.

A. System Block Diagram

FIG. 1 shows a system block diagram of an exemplary distributed cryptography network 100 according to some embodiments. The exemplary distributed cryptography network may comprise cryptographic devices 102-108, client computers 110 and 112, unsecured network 114, optional proxy device 116 and optional storage server 118.

Although only four cryptographic devices 102-108 are shown, embodiments can be practiced with any number of cryptographic devices. Likewise, although only two client computers 110 and 112 are shown, distributed symmetric cryptography as a service can be practiced with any number of client computers.

The computers and devices of FIG. 1 may communicated with each other via a communication network (such as unsecured network 114), which can take any suitable form, and may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers and devices may be transmitted using a secure communications protocol, such as, but not limited to, File Transfer Protocol (FTP); HyperText Transfer Protocol (HTTP); Secure HyperText Transfer Protocol (HTTPS); Secure Socket Layer (SSL), ISO (e.g., ISO 8583) and/or the like.

The distributed cryptography network may enable initiating devices, such as client computers 110 and 112 to encrypt messages or decrypt ciphertext using cryptographic materials (secret shares) securely stored by cryptographic devices 102-108. Client computers 110 and 112 may communicate with cryptographic devices 102-108 either directly, via a network (such as the Internet or unsecured network 114) or via optional proxy device 116. The client computers 110-112 may possess messages to be encrypted ("plaintext messages" or "plaintext") or decrypted ("ciphertext messages" or "ciphertext"), as well as hardware, software, code, or instructions that enable client computers 110-112 to participate in distributed symmetric cryptographic processes. A client computer may comprise an example of an "initiating device," a computer or other device that initiates a distributed symmetric cryptographic process. However, it should be understood that distributed symmetric cryptography can be performed without client computers. For example, the cryptographic devices 102-108 could perform distributed symmetric cryptography on their own behalf, or on behalf of an entity that is not a client (such as an entity that operates the cryptographic devices 102-108).

Each cryptographic device 102-108 may possess one or more secret shares and may optionally possess a verification share. Secret shares and verification shares may correspond to secret values and verification values respectively, as described above in Section II. The verification value may correspond to a verification key that can be used by cryptographic devices 102-108 to verify verification signatures produced using the verification shares. A threshold number of secret shares t may enable the cryptographic devices to perform distributed symmetric cryptographic operations. Likewise, a threshold number of verification shares t may allow the generation of a verification signature. The threshold number t may be less than the total number of cryptographic devices 102-108. For example, if there are twenty cryptographic devices 102-108, the threshold number t may be 14 cryptographic devices, or any other appropriate number of cryptographic devices.

The cryptographic devices 102-108 may be organized into a cryptographic device network. This cryptographic device network may comprise a local area network connected to a larger computer network, such as the Internet or unsecured network 114. Communications between the cryptographic device network and external computers (e.g., client computers 110 and 112) may be mediated by the proxy device 116, which may comprise a web server that communicates with client computers 110 and 112 via any appropriate means (e.g., an Application Programming Interface (API)).

A cryptographic device network may be organized into any appropriate networking structure. For example, a cryptographic device network may comprise a "chain" structure, whereby the cryptographic devices are organized into a linear sequence of cryptographic devices. Communications from a client computer 110 to one cryptographic device (e.g., cryptographic device 108) may pass through all the preceding cryptographic devices (e.g., cryptographic device 102-106) and proxy device 116 before reaching the intended recipient. Alternatively, the cryptographic device network may comprise a "tree" structure, with different branches comprising different collections of cryptographic devices (e.g., one branch may comprise cryptographic devices 102 and 104, and another branch may comprise cryptographic devices 106 and 108). A cryptographic device network may comprise any number of proxy devices 116, which may act as proxies to cryptographic devices or other proxy devices 116.

As described herein, cryptographic devices 102-108 may (prior to performing distributed symmetric cryptography) perform methods that enables the cryptographic devices 102-108 to generate and distribute secret shares without the need of a trusted external server. These methods can involve cryptographic devices 102-108 communicating with one another. These communications may be mediated or transmitted via optional proxy device 116.

During secret share generation, a plurality of cryptographic devices can act as generating devices (e.g., cryptographic devices 102 and 104 can act as generating devices). This plurality of generating devices may comprise a threshold number of generating devices t. A second plurality of cryptographic devices may act as receiving devices (e.g., cryptographic devices 106 and 108 can act as receiving devices). This second plurality of cryptographic devices may comprise n–t cryptographic devices, where n is the total number of cryptographic devices. The generating devices may generate their own secret shares, as well as a plurality of partial secret shares. These partial secret shares may be used by the receiving devices to generate their own secret shares (sometimes referred to as receiving device secret shares).

A plurality of cryptographic devices can also act as confirming devices. The confirming devices are tasked with generating confirmation values $a_i$. These confirmation values can be used by cryptographic devices 102-108 to confirm that the secret shares and partial secret shares were generated and distributed correctly. In some embodiments, the plurality of confirming devices can comprise a threshold number of confirming devices t selected from among the plurality of cryptographic devices (i.e., cryptographic devices 102-108). Confirming devices can comprise any combination of generating devices and receiving devices. In some embodiments, all cryptographic devices can act as confirming devices.

Unsecured network 114 may comprise a computer network over which client computers 110 and 112 communicate with one another. Unsecured network 114 may comprise a network such as the Internet. A client computer such as client computer 110 may communicate with cryptographic devices 102-108 in order to encrypt a message, enabling client computer 110 to securely transmit the encrypted message via unsecured network 114. For example, client computer 110 can transmit an encrypted message to client computer 112, which can then communicate with cryptographic devices 102-108 in order to decrypt the message.

Storage server 118 may comprise any database server or other appropriate server system that can store data on behalf of cryptographic devices 102-108, client computers 110-112 and any other appropriate computers or devices. As an example, this data may include encrypted messages (ciphertexts) as well as any information that may enable client computers 110-112 and cryptographic devices 104-108 to decrypt these ciphertexts (including commitments, as described in Section V below).

As an example, the distributed cryptography network 100 may be used to securely manage and store medical records for hospitals. In this example, client computers 110 and 112 may comprise computer systems that manage medical records for a first hospital and a second hospital respectively. These hospitals may not be equipped to encrypt medical records on their own. As such, in order to comply with patient confidentiality rules, these hospitals may use the cryptography service provided by cryptographic devices 102-108 in order to encrypt medical records before storing them in a medical record database (e.g., storage server 118).

If a patient is being transferred from the first hospital to the second hospital, the client computer corresponding to the first hospital (e.g., client computer 110) can transmit the encrypted medical record to the client computer corresponding to the second hospital (e.g., client computer 112). The client computer corresponding to the second hospital can decrypt the medical record by using the distributed cryptography service provided by cryptographic devices 102-108 or a different set of cryptographic devices that are in the cryptographic device network. When one of the hospitals needs to access a medical record, (e.g., prior to a meeting between a doctor and a patient corresponding to the medical record), client computer 110 or 112 can communicate with cryptographic devices 102-108 in order to decrypt the medical record. In this way the hospitals can use the distributed symmetric cryptography system 100 to securely store, access, and transmit sensitive data such as medical records.

B. Cryptographic Device

Figure 2:
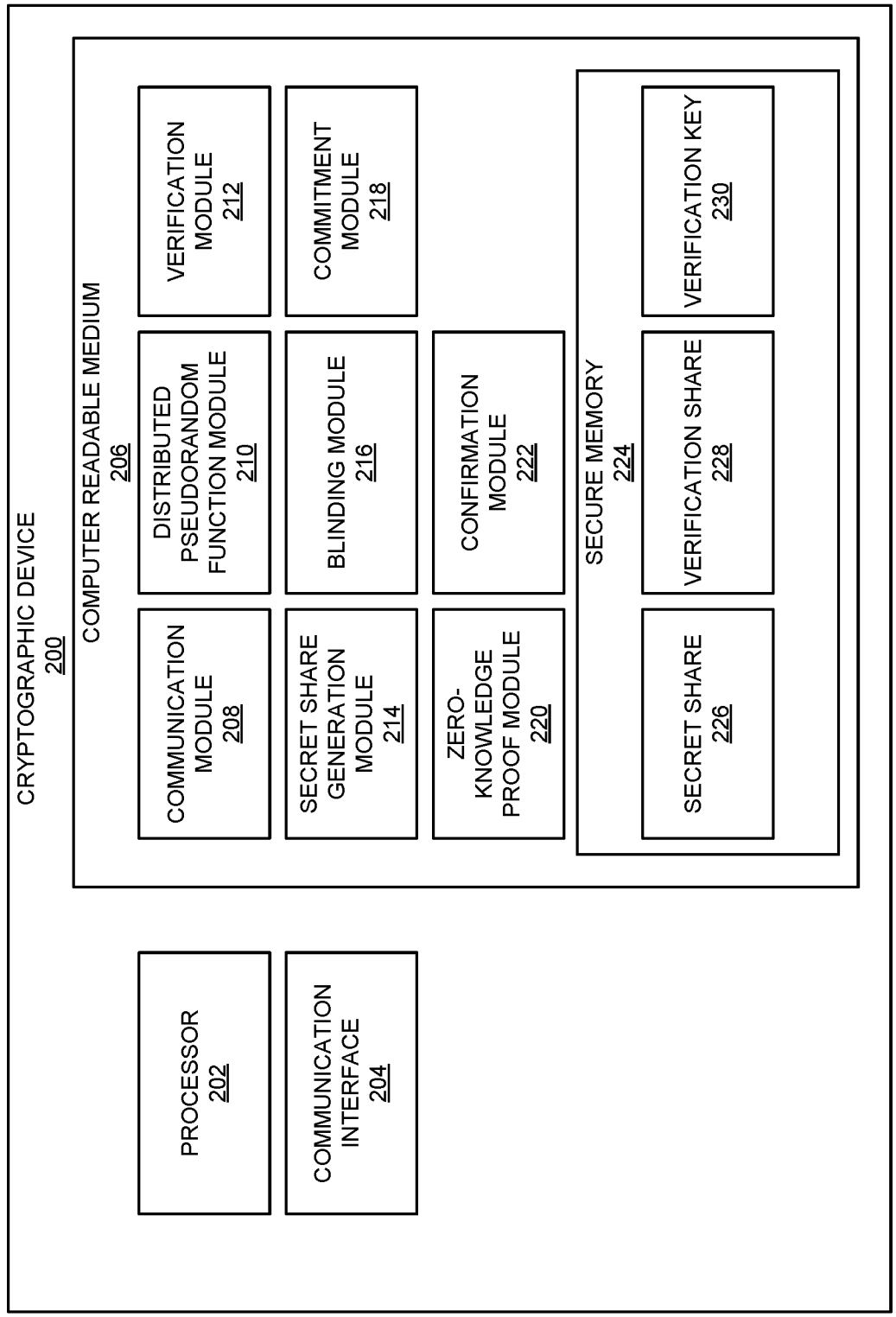
FIG. 2 shows a system block diagram of an exemplary cryptographic device according to some embodiments.

FIG. 2 displays an exemplary cryptographic device 200 according to some embodiments. The cryptographic device 200 may comprise a computer or other device in a cryptographic device network. In some embodiments, cryptographic device 200 may comprise a server computer. Cryptographic device 200 may perform a threshold secret share generation process with other cryptographic devices in order to generate a secret share 226. Cryptographic device 200 may store the secret share 226 in a secure memory element 224, along with a verification share 228 (which can be used to generated verification signatures) and a verification key 230 (which can be used to verify verification signatures).

During distributed symmetric cryptographic operations, the secret share and verification share may be used by the cryptographic device to generate partial computations and partial signatures using a distributed pseudorandom function. The partial computations may be used by an initiating device (e.g., a client computer) to generate a session key. The session key can be used by the client computer to encrypt or decrypt messages. Cryptographic device 200 may comprise a processor 202, a communication interface 204, and a computer readable medium 206.

1. Processing, Communicating, and Storing

Processor 202 may comprise any suitable data computation device or devices. Processor 202 may be able to interpret code and carry out instructions stored on computer readable medium 206. Processor 202 may comprise a central processing unit (CPU) operating on a reduced instructional set, and may comprise a single or multi-core processor. Processor 202 may include an arithmetic logic unit (ALU) and a cache memory. These components may be used by processor 202 in executing code or other functions.

Communications interface 204 may comprise any interface by which cryptographic device 200 may communicate with other computers or devices. Examples of communication interfaces include wired interfaces, such as USB, Ethernet, or FireWire. Examples also include interfaces used for wireless communication, such as a Bluetooth or Wi-Fi receiver. Cryptographic device 200 may possess multiple communication interfaces 204, such as a micro USB port, an Ethernet port, a cellular receiver, a Bluetooth receiver, etc.

Cryptographic device 200 may communicate with other devices or computers using communication interface 204 via one or more secure and authenticated point-to-point channels. These channels may use standard public-key infrastructure. For example, cryptographic device 200, acting as a generating device, can exchange a symmetric key with another cryptographic device (i.e., a receiving device) via their communication interfaces. As another example, cryptographic device 200 and an initiating device (e.g., a client computer) may exchange a symmetric key via their communication interfaces. These key exchanges may comprise, for example, Diffie-Hellman key exchanges.

After exchanging cryptographic keys, cryptographic device 200 and the client computer or other cryptographic device may communicate over a public channel (such as an unsecured network) using a standard authenticated encryption scheme to encrypt any message with the cryptographic key. Further authentication methods can also be used, e.g., digital signatures. By performing this key exchange, communications between cryptographic device 200 and a cryptographic device or client computer may be encrypted, allowing cryptographic device 200 and the client computer or other cryptographic device to communicate securely over an unsecured network.

Computer readable medium 206 may comprise hardware that may possess or store code, data or instructions that can be interpreted by processor 202. Computer readable medium 206 may store or otherwise comprise a number of software modules, including a communication module 208, a distributed pseudorandom function module 210, a verification module 212, a secret share generation module 214, a blinding module 216, a commitment module 218, a zero-knowledge proof module 220, a confirmation module 222, and a secure memory 224. The secure memory element may store a secret share 226, a verification share 228, and a verification key 230.

2. Communication Module

Communication module 208 may comprise or include code or instructions that may be used by processor 202 to enable the cryptographic device 200 to communicate with other computers or devices, including client computers, proxy devices, and other cryptographic devices, using any appropriate communications protocol. Communication module 208 may comprise code or instructions, executable by the processor 202 for transmitting a plurality of blinded partial secret shares to their corresponding receiving devices (e.g., when cryptographic device 200 is acting as a generating device), receiving blinded partial secret shares from other cryptographic devices (e.g., when cryptographic device 200 is acting as a receiving device), and receiving requests for cryptographic services from initiating devices (e.g., requests to perform encryption or decryption). These requests may include message commitments generated using a message and a hash function. The message commitment may be used to generate a partial computation that can be transmitted back to the initiating device, which can then use the partial computation and a plurality of other partial computations to generate a session key used to perform cryptography.

Additionally, communication module 208 may enable the cryptographic device 200 to receive a plurality of confirmation values from a plurality of confirming devices. The cryptographic device can use these confirmation values (and confirmation module 222) to verify that secret shares were generated and distributed correctly. Alternatively, if cryptographic device 200 is acting as a confirming device, cryptographic device 200 can use communication module 208 to transmit confirming values to other cryptographic devices. Additionally, the cryptographic device 200 can use communication module 208 to transmit and receive commitments and zero-knowledge proofs, to or from other cryptographic devices. Further, communication module 208 can be used by cryptographic device 200 to receive commitments and verification signatures from client computers and transmit partial computations and partial signatures to client computers.

3. Distributed Pseudorandom Function Module

The distributed pseudorandom function module 210 may comprise code for the purpose of evaluating pseudorandom functions (PRFs) or distributed pseudorandom functions (DPRFs). This may include, for example, performing cryptographic operations associated with elliptic curve cryptography, block ciphers such as AES, or hash functions such as SHA-2.

As an example, the distributed pseudorandom function module 210 may comprise code that may be used by processor 202 in order to implement elliptic curve cryptography under the decisional Diffie-Hellman assumption. Elliptic curve cryptography may be used to generate one or more partial computations based on one or more commitments (e.g., message commitments based on messages m) and one or more secret shares 226. If the cryptographic device 200 generates multiple partial computations, the partial computations may be combined into a single partial computation, and transmitted to a client computer. The client computer can use this partial computation, along with other partial computations received from other cryptographic devices to produce a cryptographic key that can be used to encrypt a message or decrypt ciphertext, for example, as described above in Section II.

Thus processor 202 may use the distributed pseudorandom function module 210 in order to perform elliptic curve cryptography using the commitment or commitments as inputs. Alternatively, the processor 202 may use the distributed pseudorandom function module 210 to generate one or more commitments using a message m and optionally one or more random values r as inputs. The one or more commitments may be converted into one or more points in an elliptic curve group, which may each be point multiplied by a respective secret multiplicand (e.g., secret shares 226) to produce product points. The product points may comprise partial computations that may be combined into a single partial computation (e.g., by calculating the product) and transmitted to an initiating device (e.g., a client computer). The client computer can then combine the partial computations in order to generate a session key.

Additionally, the distributed pseudorandom function module 210 may comprise code that may be used by processor 202 in order to perform operations associated with pairing-based cryptography, including the evaluation of bilinear mappings. For example, the cryptographic device could use a bilinear mapping to generate a nonce based on a hash of an identifier and a hash of a commitment, then use that nonce as the input to a cryptographic function, such as an elliptic curve cryptography function.

4. Verification Module

Verification module 212 may comprise code or instructions, executable by processor 202 for generating partial signatures and verifying verification signatures. Verification signatures may be used by cryptographic device 200 to determine whether a client computer is making legitimate use of the distributed symmetric cryptography system, and whether the client computer is using the distributed symmetric cryptography system to encrypt or decrypt data. The presence of a valid verification signature may indicate that the client computer is decrypting data, as the cryptographic device 200 may verify the verification signature during distributed symmetric decryption.

Verification module 212 may use a verification share 228 (stored in secure memory 224) in order to generate a partial signature using one or more commitments received from a client computer. The cryptographic device 200 can use verification module 212 to generate the partial signature by encrypting the commitment using its corresponding verification share 228. Alternatively, the cryptographic device 200 can use verification module 212 to generate the partial signature by encrypting the commitment using its corresponding verification share 228 using any appropriate form of homomorphic cryptography. As another alternative, verification module 212 may generate the partial signature using one or more commitments, the verification share 228 and an appropriate message authentication code (MAC) algorithm.

The cryptographic device 200 may transmit the partial signature to the client computer, which may also receive a number of other partial signatures from other cryptographic devices. The client computer may combine these partial signatures to generate a verification signature. The client computer may then store the verification signature. At another time, when the client computer wants to decrypt a ciphertext, the client computer may transmit the verification signature to cryptographic device 200. Cryptographic device 200 may then use the verification module 212 and a verification key 230 to verify the verification signature. Verification key 230 may correspond to a verification value used to produce verification share 228 and other verification shares belonging to other cryptographic devices. In some embodiments, verification key 230 and the verification value may comprise an asymmetric key pair. As an example, verification key 230 may comprise a public cryptographic key and the verification value corresponding to verification share 228 may comprise a private cryptographic key.

A verification signature may comprise one or more commitments $H_n(m)$ encrypted using the verification value. The verification signature may be decrypted using verification key 230 to produce the one or more commitments $H_n(m)$. Cryptographic device 200 may use verification module 212 in order to decrypt the verification signature using verification key 230 and compare the resulting commitment (or commitments) to a commitment received from a client computer. If the two commitments match, the verification signature may be legitimate. Alternatively, cryptographic device 200 may use verification module 212 to verify a verification signature using any other appropriate method, such as a method based off pairing friendly elliptic curves, message authentication codes (MACs), hashed message authentication codes (HMACs) etc. Example techniques for verifying signatures can be found in: [1] Boldyreva A. (2003) "Threshold Signatures, Multisignatures and Blind Signatures Based on the Gap-Diffie-Hellman-Group Signature Scheme." In: Desmedt Y. G. (eds) Public Key Cryptography—PKC 2003. PKC 2003. Lecture Notes in Computer Science, vol 2567. Springer, Berlin, Heidelberg; [2] Victor Shoup. 2000. "Practical threshold signatures." In Proceedings of the 19th international conference on Theory and application of cryptographic techniques (EUROCRYPT'00). Springer-Verlag, Berlin, Heidelberg, 207-220.; and [3] Naor M., Pinkas B., Reingold O. (1999) Distributed Pseudo-random Functions and KDCs. In: Stem J. (eds) Advances in Cryptology—EUROCRYPT'99. EUROCRYPT 1999. Lecture Notes in Computer Science, vol 1592. Springer, Berlin, Heidelberg.

5. Secret Share Generation Module

Secret share generation module 214 may comprise code or instructions, executable by processor 202 for generating secret shares and partial secret shares. This may include, for example, code that enables cryptographic device 200 to generate its own secret share (when acting as a generating device), or generate its secret share using blinded partial secret shares received from generating devices (when acting as a receiving device). Secret share generation module 214 may enable the cryptographic device 200 to generate a secret share using a random sampling process, e.g., by sampling from an interval of positive integers defined by a prime order p. The secret share generation module 214 may comprise code that implements a function used to generate the secret share by calculating a sum of the plurality of blinded partial secret shares.

Further, secret share generation module 214 may comprise code, executable by cryptographic device 200 for generating a plurality of partial secret shares using a plurality of coefficients and a secret share (generated by the cryptographic device 200). Each partial secret share can correspond to a particular receiving device, and the coefficients can comprise Lagrange coefficients, each Lagrange coefficient corresponding to the cryptographic device 200 and a receiving device.

6. Blinding Module

Blinding module 216 may comprise code or instructions, executable by processor 202 for generating blinding values and blinding partial secret shares using those blinding values. Blinding module 216 may be used by cryptographic device 200 to generate blinding values using a technique known as "zero-sharing," which is described further below in Section IV.A.

Particularly, blinding module 216 may comprise code or instructions, executable by processor 202 for generating a blinding value $z_i$ using a plurality of seed values and a pseudorandom function. Each seed value of the plurality of seed values can correspond to the cryptographic device 200 and a (respective) generating device. Using the plurality of seed values, the pseudorandom function, and optionally a nonce ctr, the cryptographic device can use blinding module 216 to generate a plurality of random values $r_{i,i'}$. These random values can be combined to produce the blinding value $z_i$. The subscripts i and i' can correspond to the indices or numeric devices identifiers associated with the generating cryptographic device 200 and the respective generating device.

The blinding module 216 may comprise code, executable by the processor 202 for combining the random values to produce the blinding value $z_i$ using any appropriate means. For example, the blinding module can combine the plurality of random values $r_{i,i'}$ using the formula: $z_i = \Sigma_{i'<i} r_{i,i'} - \Sigma_{i'>i} r_{i,i'}$. In other words, the blinding module 216 can be used by the cryptographic device to generate a first sum $\Sigma_{i'<i} r_{i,i'}$, and a second sum $\Sigma_{i'<i}r_{i,i'}$, then combine the plurality of random values by calculating a difference between the first sum and the second sum. The first sum can comprise a sum of a first set of random values. Each random value of the first set of random can correspond to a respective numeric generating device identifier i' that is less than a numeric identifier associated with the (generating) cryptographic device 200 i. The second sum can comprise a sum of a second set of random values. Each random value of the second set of random values can correspond to a respective numeric generating device identifier i' that is greater than a numeric identifier associated with the cryptographic device 200 i. As described below in Section IV.A, this formulation results in the property that the sum of the blinding values equals zero: $\Sigma z_i=0$.

Additionally, blinding module 216 may comprise code, executable by processor 202 for generating a plurality of blinded partial secret shares $u_{i,j}$ by adding the blinding value to each partial secret share of a plurality of partial secret shares. These partial secret shares can be generated by cryptographic device 200 using secret share generation module 214, as described further above and in Section IV below.

7. Commitment Module

Commitment module 218 may comprise code or instructions, executable by processor 202 for generating commitments $w_i$ of secret shares. These may include secret shares generated using secret share generation module 214. In some embodiments, generating commitments of secret shares may comprise performing a group exponentiation on a generator value g using the secret share $sk_i$, that is, $w_i=g^{sk_i}$. The generator g may correspond to a mathematical group with prime order p in which the decisional Diffie-Hellman assumption holds. Alternatively, the commitment module 218 may comprise code enabling the cryptographic device 200 to generate commitments such as ElGamal commitments, or any other appropriate commitments. These commitments may be referred to as "generating device commitments" when the cryptographic device 200 is acting as a generating device, and "receiving device commitments" when the cryptographic device 200 is acting as a receiving device.

Commitment module 218 may also comprise code, executable by processor 202 for verifying that a commitment generated by the cryptographic device 200 is consistent with a plurality of commitments generated and received from a plurality of other cryptographic devices. In doing so, the cryptographic device 200 can confirm that any secret shares $sk_i$ generated using secret share generation module 214 and any commitments generated using commitment module 218 were generated correctly. This verification process can comprise exponentiating each commitment of the plurality of commitments with a corresponding coefficient $\lambda_{i,j}$, e.g., a Lagrange coefficient corresponding to both the cryptographic device 200 and a respective commitment of the plurality of commitments. In this way the cryptographic device 200 can generate a plurality of exponentiated commitments. The cryptographic device 200 can then use commitment module 218 to calculate the product of these exponentiated commitments and compare this product to the commitment $w_i$ generated by cryptographic device 200. If the product of the exponentiated commitments is equal to the commitment $w_i$, the cryptographic device 200 can confirm that the commitment $w_i$ is consistent.

8. Zero-Knowledge Proof Module

Zero-knowledge proof module 220 can comprise code or instructions, executable by processor 202 for generating and verifying zero-knowledge proofs. These zero-knowledge proofs can be used to prove to other cryptographic devices that the cryptographic device 200 is in possession of the secret share $sk_i$ corresponding to a commitment $w_i$. The cryptographic device 200 can use zero-knowledge proof module to generate a zero-knowledge proof $zk_i$ corresponding to the secret share $sk_i$ generated using secret share generation module 214 and a commitment $w_i$ generated using commitment module 218. Additionally, cryptographic device 200 can use zero-knowledge proof module to verify zero-knowledge proofs received from other cryptographic devices, using commitments corresponding to those zero-knowledge proofs.

9. Confirmation Module

Confirmation module 222 can comprise code or instructions, executable by processor 202 for generating and verifying confirmation values $a_i$. These confirmation values can be used by the cryptographic device 200 and other cryptographic devices to confirm that the secret share distribution process was executed honestly by all participating cryptographic devices. A cryptographic device that generates a confirmation value $a_i$ may be referred to as a "confirming device."

Cryptographic device 200 can use confirmation module 222 to generate a confirmation value based on a commitment generated by cryptographic device 200 and a plurality of other commitments received from other cryptographic devices. This can be accomplished by concatenating the commitments, thereby generating a concatenation, a data element comprising all the concatenated commitments. Cryptographic device 200 can then generate the confirmation value $a_i$ by hashing the concatenation using a hash function.

Additionally, cryptographic device 200 can use confirmation module 222 to verify that the confirmation value $a_i$ and a plurality of confirmation values received from other confirming devices are equivalent. In doing so, cryptographic device 200 can conclude that each cryptographic device in the cryptographic device network received the same set of commitments, and thus no cryptographic device behaved dishonestly with respect to commitment generation.

10. Secure Memory

Secure memory 224 may comprise a memory region of computer readable medium 206 or a standalone memory element. Secure memory 224 may store sensitive cryptographic materials in such a way that they are difficult to retrieve by an unauthorized outsider (e.g., a hacker). As an example, data stored in secure memory 224 may be stored in encrypted form. The secure memory 224 may store a secret share (or secret shares) 226. Additionally, secure memory 224 may store a verification share 228, as well as a verification key 230 corresponding to the verification share. Cryptographic device 200 may use secret share 226 to generate a partial computation that is used to generate a cryptographic session key. Likewise, cryptographic device 200 may use verification share 228 to derive a partial signature used to generate a verification signature. Cryptographic device 200 may use verification key 230 to verify a verification signature generated from a plurality of partial signatures.

C. Client Computer

As described above, a client computer may comprise a computer system that communicates with a distributed symmetric cryptography system (e.g., a cryptographic device network) in order to encrypt messages or decrypt ciphertext. Thus a client computer is an example of an initiating device, a device that can initiate distributed symmetric cryptography. A client computer may comprise a personal computer or a communication device associated with a user. These devices may include, for example, laptops, desktop computers, smartphones, tablets, smart watches, PDAs, etc. A client computer may also comprise a server computer or mainframe computer associated with an organization (e.g., a business).

Although client computers are not involved in the generation or distribution of secret shares, they are described here in order to provide context relating to the use of secret shares, particularly the performance of distributed symmetric cryptography as a service.

Figure 3:
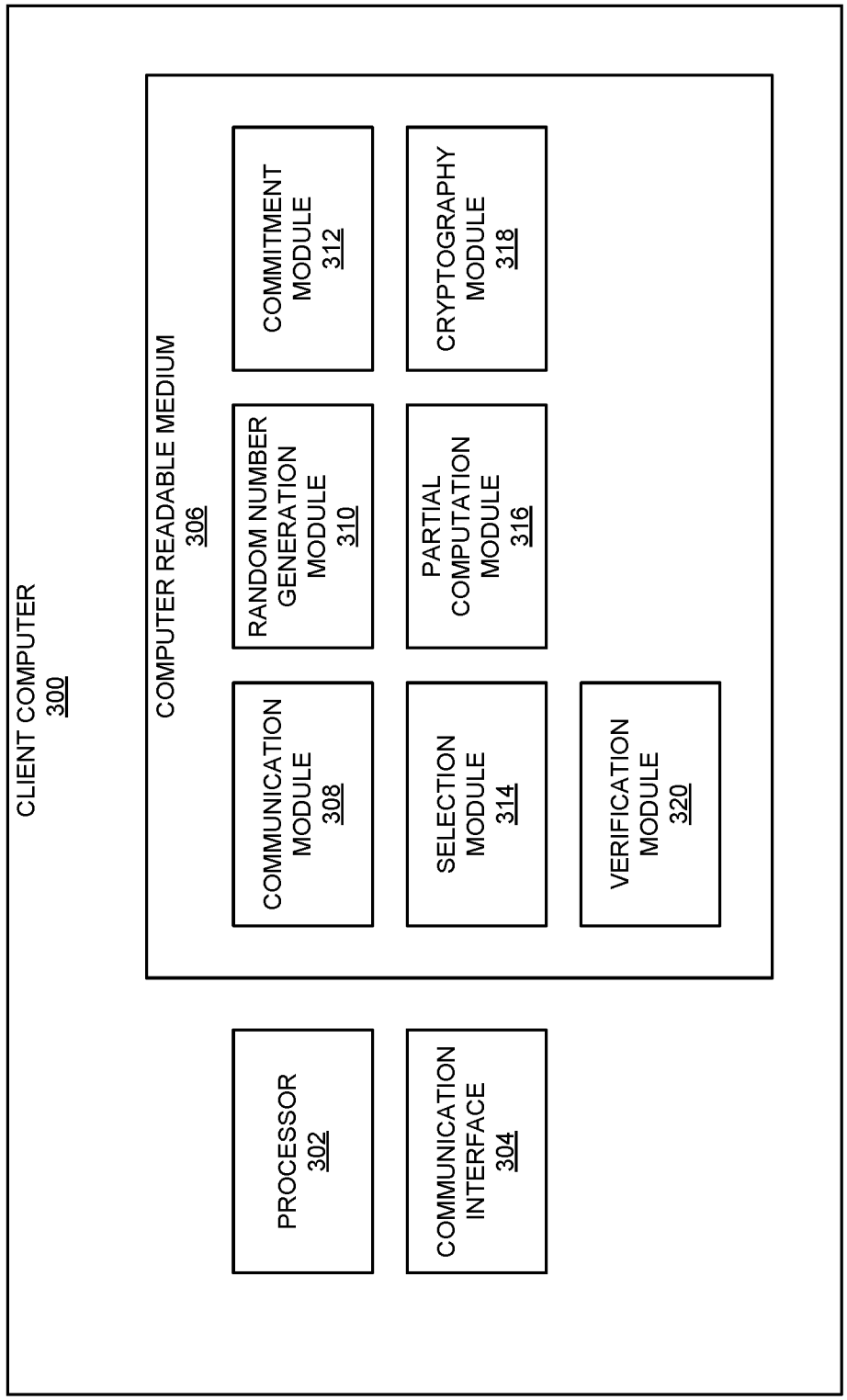
FIG. 3 shows a system block diagram of an exemplary client computer according to some embodiments.

FIG. 3 shows an exemplary client computer 300. Client computer 300 may comprise a processor 302, a communication interface 304, and a computer readable medium 306.

1. Processing, Communicating, and Storing

Processor 302 may comprise any suitable data computation device or devices. Processor 302 may be able to interpret code and carry out instructions stored on computer readable medium 306. Processor 302 may comprise a central processing unit (CPU) operating on a reduced instructional set, and may comprise a single or multi-core processor. Processor 302 may include an arithmetic logic unit (ALU) and a cache memory, these components may be used by processor 302 in executing code or other functions.

Communication interface 304 may comprise any interface by which client computer 300 may communicate with other computers or devices. Examples of communication interfaces include wired interfaces, such as USB, Ethernet, or FireWire. Examples also include interfaces used for wireless communication, such as a Bluetooth or Wi-Fi receiver. Client computer 300 may possess multiple communication interfaces 304. As an example, a client computer 300 comprising a smartphone may communicate through a micro USB port, a cellular receiver, a Bluetooth receiver, and a Wi-Fi receiver.

Client computer 300 may communicate with other devices or computers, using communication interface 304 via one or more secure and authenticated point-to-point channels. These channels may use standard public-key infrastructure. For example, client computer 300 and a cryptographic device may exchange a symmetric key and/or key shares via their communication interfaces. This exemplary key exchange may comprise a Diffie-Hellman key exchange. After exchanging cryptographic keys, client computer 300 and the cryptographic devices may communicate over a public channel (such as an unsecured network) using a standard authenticated encryption scheme to encrypt any message with the cryptographic key. Further authentication methods can also be used, e.g., digital signatures.

Computer readable medium 306 may comprise hardware that may possess code, data, or instructions that can be interpreted by processor 302. Computer readable medium 306 may store or otherwise comprise a number of software modules, including a communication module 308, a random number generation module 310, a commitment module 312, a selection module 314, a partial computation module 316, a cryptography module 318, and a verification module 320.

2. Communication Module

Communication module 308 may comprise or include code, instructions, routines, subroutines, etc., that may be used by processor 302 in order to enable the client computer 300 to communicate with other computers or devices, including other client computers, cryptographic devices, and trusted external servers, using any appropriate communications protocol. Communication module 308 may comprise code or instructions, executable by the processor 302 for sending, receiving, formatting, and interpreting requests, messages, payloads and other data.

Communication module 308 may comprise code enabling the client computer 300 to transmit requests for cryptographic services (e.g., encryption or decryption) to a plurality of cryptographic devices. These requests may include commitments, verification signatures, random values, hashes of identifiers, and other alike data. Additionally, communication module 308 may comprise code enabling the client computer 300 to format a payload comprising a ciphertext and any additional information that can be used to generate a cryptographic key. Further, communication module 308 may comprise code enabling the client computer 300 to transmit the payload to another client computer, a storage server, or any other recipient. Likewise, communication module 308 may comprise code enabling the client computer 300 to receive and interpret payloads, messages, requests, etc. For example, the client computer 300 can use communication module 308 to determine which element in a payload is a ciphertext, which element is a commitment, etc.

3. Random Number Generation Module

Random number generation module 310 may comprise or include code, instructions, routines, subroutines, etc., that may be used by processor 302 to generate random or pseudorandom numbers. These random number may include cryptographically secure pseudorandom numbers, and the code may comprise one or more pseudorandom number generation algorithms that meet the requirements for cryptographic security. As an example, these requirements may include passing the "next bit test" and passing a "state compromise extension test." Examples of cryptographically secure random number generators include the Yarrow, ChaCha20, and Fortuna algorithms, among others.

Random number generation module 310 may communicate with other modules or hardware in client computer 300 for the purpose of generating random or pseudorandom numbers. As an example, random number generation module 310 may retrieve the system time (e.g., current year, month, day hour, etc.) in order to seed a pseudorandom number generation algorithm.

Random or pseudorandom numbers may be used to "blind" (i.e., obscure) messages for the purpose of encryption or generating commitments. A message may be combined in some manner with a random or pseudorandom number in order to obscure the message. As an example, a message "hello" may be concatenated with a random number 12345 to produce the blinded message "hello12345." Alternatively, the bitwise exclusive-OR function (XOR) may be used to blind a message using a random number. By blinding messages with random numbers, client computer 300 may protect itself against some cryptographic attacks, including replay attacks. Accordingly, rather than generating a first commitment or second commitment H(m) based solely on a message m, client computer 300 may generate a commitment based on a message and a random value (e.g., H(m|r)). Additionally, instead of encrypting a message m, client computer 300 may encrypt the message m and a random value r generated using random number generation module 310.

4. Commitment Module

Commitment module 312 may comprise code or instructions used by processor 302 for selecting hash functions, generating commitments using hash functions, and identifying or determining hash functions based on hash indicators. Notably, these commitments are different from the commitments used by the cryptographic devices when generating secret shares. Client computers such as client computer 300 use commitments in order to generate a session key (used to encrypt or decrypt data) and in order to verify that data was decrypted correctly. By contrast, cryptographic devices use commitments in order to verify that the secret shares generated by the cryptographic devices were generated and distributed correctly.

Commitment module 312 may comprise a list or repository of different hash functions (e.g., SHA-256, SHA3, BLAKE2, etc.) that can be used to generate commitments. Commitment module 312 may comprise code enabling the processor 302 to select any number of hash functions from this list or repository. In some embodiments, commitment module 312 may comprise code enabling the random selection of hash functions. In others, commitment module 312 may comprise code enabling selection of hash functions according to any appropriate criteria (e.g., based on user preference, a security score, etc.)

Commitment module 312 may comprise code enabling the processor to execute the selected hash functions using messages and random values as inputs. The resulting hash values may be used by the client computer 300 as commitments. The commitment module 312 may additionally comprise code enabling the client computer 300 to verify the correctness of a decrypted message using the commitments. For example, client computer 300 can use the commitment module 312 to verify that a decrypted message m is consistent with a message commitment. If commitments produced using decrypted ciphertext match commitments produced using the corresponding plaintext, the client computer can determine that a message was not modified during encryption.

Further, commitment module 312 may comprise code enabling the processor 302 to identify or determine hash functions based on hash indicators. Hash indicators may comprise identifiers that uniquely identify a particular hash function. For example, the name of a hash function (e.g., "BLAKE2") may be used to identify the corresponding hash function. The client computer 300 may use commitment module 312 to identify the hash functions used to generate one or more commitments in order to verify those commitments were generated correctly.

5. Selection Module

Optional selection module 314 may comprise code or instructions used by processor 302 for selecting a threshold number of cryptographic devices t from cryptographic devices in the cryptographic device network. As stated above, t may correspond to the number of cryptographic devices needed to perform distributed symmetric cryptography. In some embodiments, client computer 300 may not select cryptographic devices from cryptographic devices in the cryptographic device network. Instead, client computer 300 may communicate with a proxy device and the proxy device may perform the selection process. Alternatively, the participating cryptographic devices may be pre-selected or static. As such, selection module 314 may be optional.

As an example, selection module 314 may comprise code implementing a random selection algorithm. The selection module 314 could include a list of cryptographic devices in the cryptographic device network. The selection module 314 could select randomly and without replacement from the list until a threshold number of cryptographic devices are selected. Alternatively, selection module 314 may comprise code that enables rule-based cryptographic device selection. For example, the selection module 314 may determine a threat score associated with each cryptographic device. The threat scores may correspond to a likelihood that a given cryptographic device has been compromised by a hacker or malicious user. The selection module 314 may select a threshold number of cryptographic devices with the lowest threat scores, or randomly select from cryptographic devices with a threat score under a certain value.

As another alternative, the selection module 314 may comprise code enabling the selection of cryptographic devices based on computational load. Some cryptographic devices in the cryptographic device network may already be performing distributed symmetric cryptography on behalf of other client computers, and as a result, may have a higher computational load. The client computer 300 may use selection module 314 in order to select a threshold number of cryptographic devices with a lower computational load in order to improve the throughput of the distributed symmetric cryptography system.

6. Partial Computation Module

Partial computation module 316 may comprise code or instructions that enable processor 302 to manipulate or process partial computations and intermediate computations in order to perform distributed symmetric cryptography. This may include generating intermediate computations based on partial computations and combining partial computations to generate a cryptographic key or a key generation seed. Additionally, partial computation module 216 may comprise code enabling processor 302 to generate verification signatures based on partial signatures.

Partial computation module 316 may comprise code enabling the combination of partial computations and partial signatures using any appropriate methods, functions, or algorithms. As examples, partial computations may be combined by calculating the sum or product (or any other combination) of the partial computations. Partial computation module 316 may also comprise code enabling polynomial interpolation, such as the calculation of Lagrange coefficients. These Lagrange coefficients may correspond to partial computations. Additionally, partial computation module 316 may comprise code enabling exponentiation and modular exponentiation. These code or instructions may be used by the client computer 300 to generate a session key or key generation seed based on partial computations. Client computer 300 can use the cryptography module 318 to input a key generation seed into a key generation algorithm in order to produce a cryptographic key that can be used to encrypt a message or decrypt ciphertext.

Likewise, partial computation module 316 may comprise code enabling the client computer 300 to generate verification signatures from partial signatures, using techniques similar to the those described above with reference to partial computations.

7. Cryptography Module

Cryptography module 318 may comprise code or instructions enabling processor 302 to generate cryptographic keys and perform other cryptographic operations, including the encryption of messages and decryption of ciphertext using cryptographic keys. These cryptographic keys may be generated from key generation seeds. Key generation may depend on the particular cryptosystem being used to perform cryptography. For example, for an "AES-128-CBC" cryptosystem (an AES block cipher with a 128 bit key operating in cipher block chaining mode), a key generation algorithm may accept a passphrase or key generation seed as an input and produce a 128 bit key for an AES block cipher. As examples, client computer 300 can use cryptography module 318 to encrypt a message using a (cryptographic) session key, thereby generating a ciphertext, or decrypt a ciphertext using a session key, thereby generating a message.

Additionally, client computer 300 may use cryptography module 318 to perform functions associated with pairing-based cryptography, including the evaluation of bilinear pairings. The client computer 300 may use bilinear pairings in order to map bulk keys to individual message keys used to encrypt or decrypt messages.

8. Verification Module

Verification module 320 may comprise code or instructions, executable by processor 302 for verifying partial computations using check values. Each check value may correspond to a secret share stored by a cryptographic device in a cryptographic device network. Client computer 300 may use the code or instructions stored in verification module 320 to execute an honest verifier zero knowledge (HVZK) proof in order to verify the legitimacy of the partial computations. Verification module 320 may comprise code or instructions enabling any appropriate implementation of the HVZK proof, including Schnorr's protocol and Fiat-Shamir.

IV. Generating and Distributing Secret Shares

FIGS. 4A-4F show a hybrid sequence diagram of an exemplary method of generating and distributing secret shares according to some embodiments. In FIGS. 4A-4F, a plurality of cryptographic devices are divided into a plurality of generating devices (generating device 1 (402), generating device 2 (404) and generating device 3 (406)) and a plurality of receiving devices (receiving device 4 (408), receiving device 5 (410), and receiving device 6 (412)). Thus FIGS. 4A-4F correspond to a "3-out-of-6" distributed symmetric cryptography system, with a threshold number of cryptographic devices t 3 and a total number of cryptographic devices n=6. However, the steps displayed in FIGS. 4A-4F can be extended to any threshold number of cryptographic devices t and any total number of cryptographic devices n. t=3 and n=6 were chosen only for illustrative purposes. Communications between the cryptographic devices can, if necessary, be transmitted via an optional proxy device (not shown).

A. Generation of Data Values

Figure 4A:
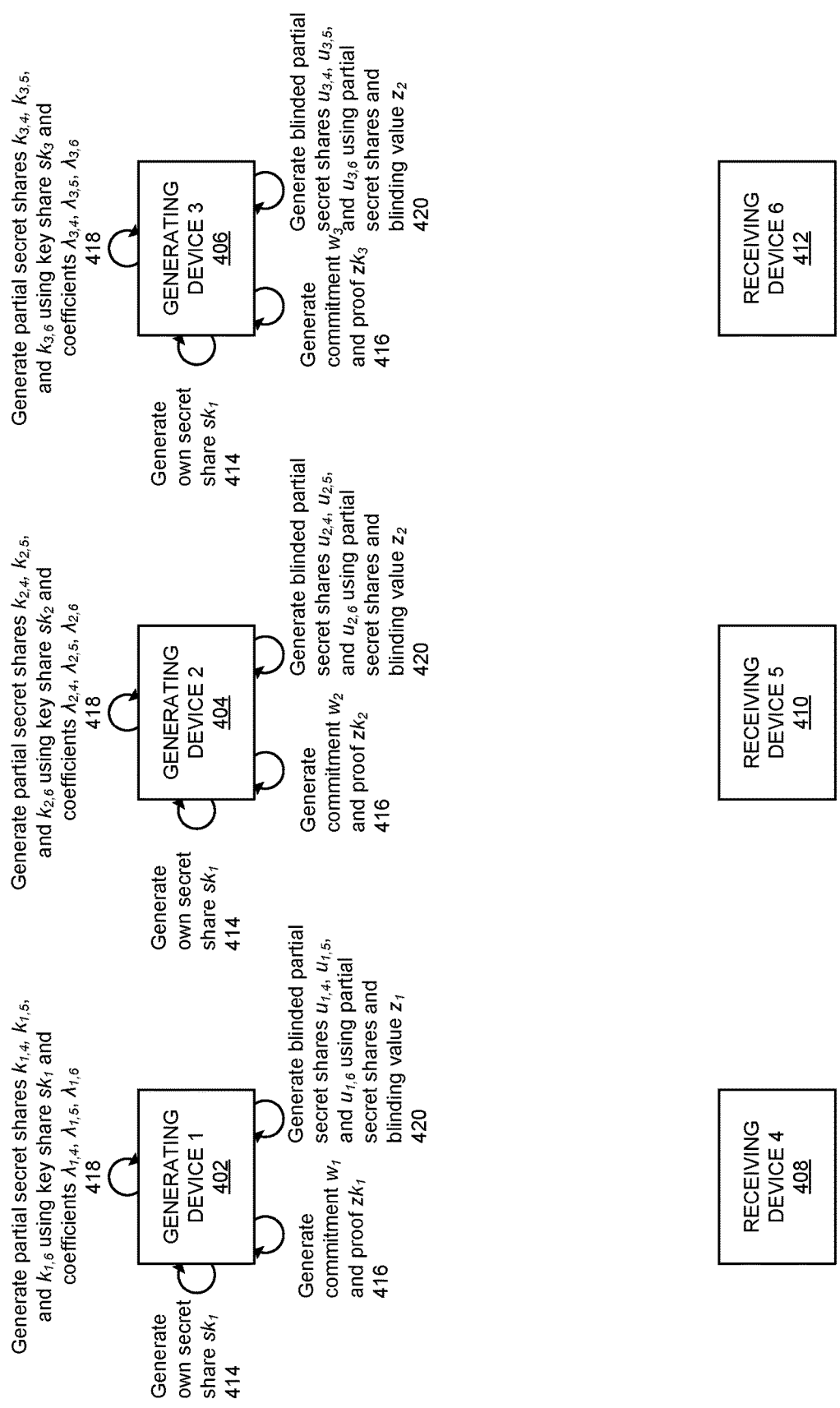

Referring to FIG. 4A, at step 414, each generating device can generate their own secret share $sk_i$. For example, generating device 1 402 can generate secret share $sk_i$, generating device 2 404 can generate secret share $sk_2$, and generating device 3 406 can generate secret share $sk_3$. These secret shares can be generated via a random sampling process. As an example, the random sampling process can comprise sampling from an interval of positive integers defined by a prime order value p, this prime order value p can correspond to a mathematical group in which the decisional Diffie-Hellman assumption holds. For example, this interval could comprise positive integers from 0 to p−1 inclusive.

At step 416, each generating device can generate a commitment $w_i$ and a zero-knowledge proof $zk_i$ corresponding to their respective secret share $sk_i$. That is, generating device 1 402 can generate commitment $w_i$ and zero-knowledge proof $zk_1$, generating device 2 404 can generate commitment $w_2$ and zero-knowledge proof $zk_2$, and generating device 3 406 can generate commitment $w_3$ and zero-knowledge proof $zk_3$. Generating a commitment of the secret share can comprise each generating device performing a group exponentiation operation on a generator value g using their respective secret share $sk_i$. This generator value g can correspond to a mathematical group under which the decisional Diffie-Hellman assumption holds. If the cryptographic devices are assumed to be honest, the cryptographic devices may not need to verify the zero-knowledge proofs and commitments generated by the generating devices. Therefore step 416 may be optional.

At step 418, each generating device can generate partial secret shares corresponding to each of the receiving devices (i.e., receiving device 4 408, receiving device 5 410, and receiving device 6 412). That is, generating device 1 402 can generate partial secret shares $k_{1,4}$, $k_{1,5}$, and $k_{1,6}$ corresponding to receiving devices 4 408, 5 410, and 6 412 respectively. Likewise, generating device 2 404 can generate partial secret shares $k_{2,4}$, $k_{2,5}$, and $k_{2,6}$ corresponding to receiving devices 4 408, 5 410, and 6 412 respectively. Finally, generating device 3 406 can generate partial secret shares $k_{3,4}$, $k_{3,5}$, and $k_{3,6}$ corresponding to receiving devices 4 408, 5 410, and 6 412 respectively. The plurality of partial secret share can be generated using a plurality of coefficients and each respective generating device's secret share $sk_i$. These coefficients can comprise Lagrange coefficients $\lambda_{i,j}$ corresponding to each generating device and a respective receiving device of the plurality of receiving devices. A generating device can calculate the plurality of partial secret shares as a product of its secret share and the Lagrange coefficients. For example, generating device 1 402 can calculate partial secret share $k_{1,4}$ by calculating the product of secret share $sk_i$ and Lagrange coefficient $\lambda_{1,4}$.

At step 420, each generating device can blind their respective partial secret shares $k_{i,4}$, $k_{i,5}$, and $k_{i,6}$, thereby generating blinded partial secret shares $u_{i,4}$, $u_{i,5}$, and $u_{i,6}$. Each generating device can blind their partial secret shares by adding a blinding value $z_i$ to each partial secret share of the plurality of partial secret shares. For example, generating device 1 402 can generate blinded partial secret shares according to the following formula: $u_{1,4}=k_{1,4}+z_1$, $u_{1,5}=k_{1,5}+z_1$, and $u_{1,6}=k_{1,6}+z_1$. Performing this blinding operation prevents dishonest receiving devices from determining the secret shares $sk_i$ used to generate partial secret shares $k_{i,j}$, which could enable dishonest receiving devices to perform encryption or decryption operations using secret shares that do not belong to the dishonest receiving devices.

In order to perform this step, the generating devices can generate the blinding values $z_i$ using a technique known as zero-sharing, which is described in the following subsection.

1. Zero-Sharing

As described above, zero-sharing involves generating blinding values $z_i$ that are subject to the condition that the sum of the blinding values $z_i$ equals zero. This enables the blinding values $z_i$ to be used to blind the partial computations $k_y$, and generate blinded partial computations $u_{i,j}$ without affecting the value of the sum. That is: $\Sigma_i u_{i,j}=\Sigma_i k_{i,j}+\Sigma_i z_i=\Sigma_i k_{i,j}=\Sigma_i k_{i,j}$.

There are many ways in which zero-sharing can be accomplished. The following is intended only as one non-limiting example. Each generating device may have access to a pseudorandom function F. The pseudorandom function F takes in an input and produces a pseudorandom output. The pseudorandom function F is consistent, such that it produces the same output when supplied with the same input.

For each pair of generating devices, comprising a first generating device i and a second generating device i', each generating device in that pair can possess a seed value $s_{i,j}$ corresponding to the generating device i and the generating device i'. Thus for a collection of t generating devices, there may be $$\binom{t}{2} = \frac{t!}{2!(t-2)!}$$

such pairs and seed values $s_{i,j}$. If the generating devices are established prior to the secret share generation and distribution process, the seed values $s_{i,i'}$ can likewise be established beforehand.

There are many ways in which a pair of cryptographic devices can establish a seed value shared between those cryptographic devices. The following is intended only as one non-limiting example. Among each pair of generating devices, the first generating device (e.g., the device with a lower index or serial number) can generate a random or pseudorandom number to use as the seed value $s_{i,j}$. The first generating device can transmit the seed value $s_{i,j}$ to the second generating device over a secure point-to-point channel. Later, all generating devices can participate in a secure multi-party computation to establish that no groups of devices inadvertently generated the same seed value $s_{i,i'}$.

To generate their respective blinding values $z_i$, each generating device can first generate a plurality of random values $r_{i,i'}$ using the pseudorandom function F, i.e., $r_{i,i'}=F(s_{i,i'}, \text{ctr})$, where ctr is a nonce or counter value, used to reduce the risk of exposing the seed values $s_{i,i'}$. As an example, if there are five generating devices, the first generating device could generate four corresponding random values $(r_{1,2}, r_{1,3}, r_{1,4}, r_{1,5})$, the second generating device could generate four random values $(r_{2,1}, r_{2,3}, r_{2,4}, r_{2,5})$, etc. Note that in this example, random values $r_{1,2}$ and $r_{2,1}$ are generated using the same seed value and nonce, and are thus identical.

Using their respective intermediate random values $r_{i,i'}$ each generating device can define their respective blinding value $z_i$ using the following formula: $z_i \Sigma_{i'<i} r_{i,i'} - \Sigma_{i'<i} r_{i,i'}$. Put another way, each generating device can generate a first sum $\Sigma_{i'<i} r_{i,i'}$ and a second sum $\Sigma_{i'<i} r_{i,i'}$, then calculate the blinding values $z_i$ as a difference between the first sum and the second sum. The first sum can comprise a sum of a first set of random values of the plurality of random values for which the index or numeric device identifier of the second generating device i' is less than the index or numeric generating device identifier (e.g., a serial number) of the first generating device i. The second sum can comprise a sum of a second set of random values of the plurality of random values for which the index or numeric device identifier of the second generating device i' is less than the index or numeric device identifier of the first generating device.

This disclosure does not provide a rigorous proof that this formulation of the blinding values $z_i$ sums to zero. However, it can be shown intuitively as follows. For each blinding value $z_i$ for which random value $r_{i,i'}$ increases the value of one blinding value, there must be another $z_i$ for which the random value $r_{i,i'}$ decreases the value of another blinding value by the same amount. As such, when summing the values $z_i$, each of these intermediate random values $r_{i,i'}$ cancel one another out, leading to a sum of zero.

This can be shown using the exemplary values provided above. To reiterate, in a group comprising five generating devices, a first generating device can generate four intermediate random values $(r_{1,2}, r_{1,3}, r_{1,4}, r_{1,5})$ and a second generating device could generate four intermediate random values $(r_{2,1}, r_{2,3}, r_{2,4}, r_{2,5})$. For the first generating device, intermediate random value $r_{1,2}$ has a second index i'=2 that is greater than the first index i=1. Thus the value $r_{1,2}$ will be included in the second sum $\Sigma_{i'<i} r_{i,i'}$, and thus reduce the value of $z_1$. However, for the second generating device, intermediate random value $r_{2,1}$ (which is equal to $r_{1,2}$) has a second index i'=1 that is less than the first index i=2. Thus the value $r_{2,1}$ will be included in the first sum $\Sigma_{i'<i} r_{i,i'}$, and increase the value of $z_2$. When and if $z_2$ and $z_1$ are summed, the values of $r_{1,2}$ and $r_{2,1}$ will cancel each other out. This can be shown for all intermediate random values $r_{i,i'}$.

In summary, one method of zero sharing is as follows. Each generating device possesses seed values $s_{i,i'}$ that they can use to generate intermediate random values $r_{i,j}$. These intermediate random values can be summed and subtracted from one another based on the relative values of their indices or serial numbers i and i' to produce the blinding values $z_i$ according to the following formula: $z_i = \Sigma_{i'<i} r_{i,i'} - \Sigma_{i'<i} r_{i,i'}$. Each generating device can then sum their respective blinding value $z_i$ with their partial secret shares $k_{i,j}$ to generate blinded partial secret shares $u_{i,j}$, i.e., according to the formula $u_{i,j} = k_{i,j} + z_i$.

B. Generation of Receiving Device Secret Shares

Figure 4B:
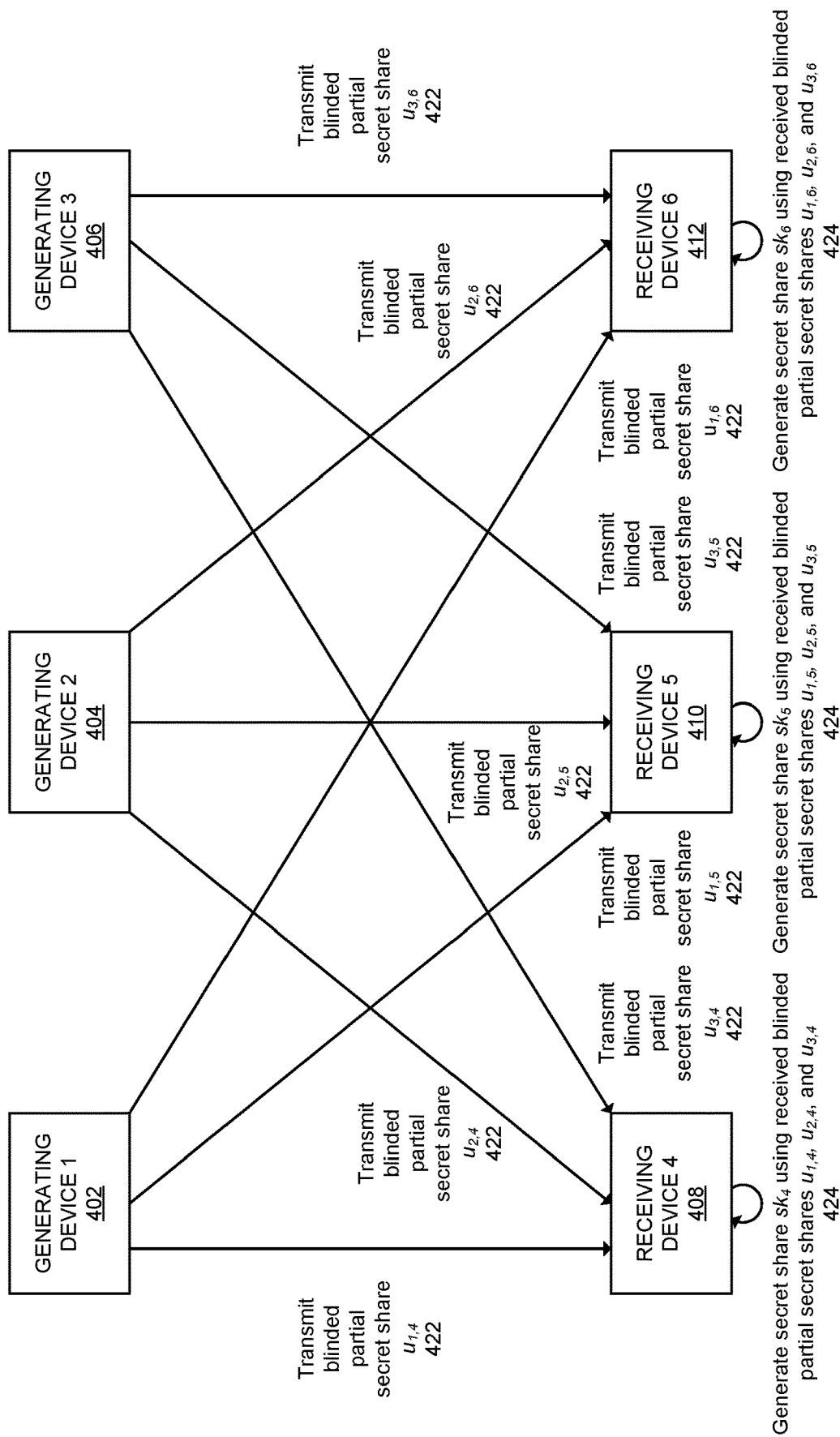

Moving on to FIG. 4B, at step 422, each generating device can transmit each of the plurality of blinded partial secret shares $u_{i,j}$ to the corresponding receiving devices of the plurality of receiving devices. That is, generating device 1 402 can transmit blinded partial secret share $u_{1,4}$ to receiving device 4 408, blinded partial secret share $u_{1,5}$ to receiving device 410, and blinded partial secret share $u_{1,6}$ to receiving device 6 412. Likewise, generating device 2 404 can transmit blinded partial secret share $u_{2,4}$ to receiving device 4 408, blinded partial secret share $u_{2,5}$ to receiving device 5 410, and blinded partial secret share $u_{2,6}$ to receiving device 6 412. Additionally, generating device 3 406 can transmit blinded partial secret share $u_{3,4}$ to receiving device 4 408, blinded partial secret share $u_{3,5}$ to receiving device 410, and blinded partial secret share $u_{3,6}$ to receiving device 6 412. In this way the receiving devices can receive the plurality of blinded partial secret shares from the plurality of generating devices.

At step 424, each receiving device can generate their respective secret share $sk_j$ using the blinded partial secret shares $u_{i,j}$ received at step 422. That is, receiving device 4 408 can generate its respective secret share $sk_4$ using blinded partial secret shares $u_{1,4}$, $u_{2,4}$, and $u_{3,4}$. Likewise, receiving device 5 410 can generate its respective secret share $sk_5$ using blinded partial secret shares $u_{1,5}$, $u_{2,5}$, and $u_{3,5}$. Further, receiving device 6 412 can generate its respective secret share $sk_6$ using blinded partial secret shares $u_{1,6}$, $u_{2,6}$, and $u_{3,6}$. The receiving device can generate these secret shares by combining the blinded partial secret shares received from the generating devices. This combination may comprise, for example, calculating the secret share $sk_j$ as a sum of the plurality of blinded partial secret shares. For example, receiving device 4 408 can calculate $sk_4 = u_{1,4} + u_{2,4} + u_{3,4}$.

C. Distribution of Commitments and Zero-Knowledge Proofs

Figure 4C:
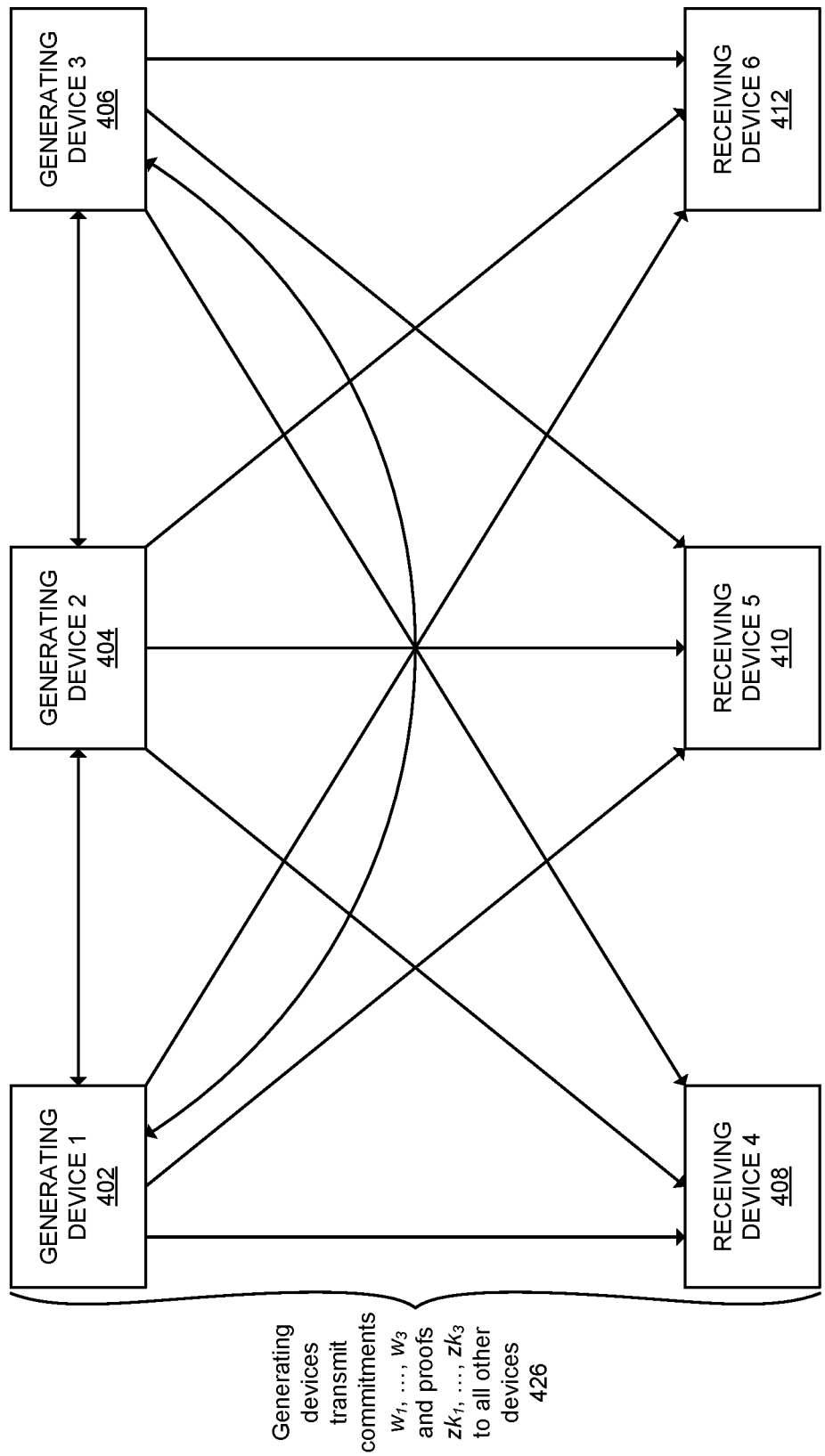

Referring now to FIG. 4C, at step 426, the generating devices 1 402, 2 404, and 3 406 can each transmit their respective commitments $w_i$ and zero-knowledge proofs $zk_i$ to all other cryptographic devices (as an example, generating device 1 402 can transmit commitment $w_1$ and zero-knowledge proof $zk_1$ to generating devices 2 404 and 3 406, and receiving devices 4 408, 5 410, and 6 412. In this way, each cryptographic device can receive one or more commitments and zero-knowledge proofs from the plurality of generation devices. If the generating devices did not generate commitments and zero-knowledge proofs (e.g., because the cryptographic devices are known or assumed to be honest), step 426 can be skipped.

D. Generation of Receiving Device Commitments

Figure 4D:
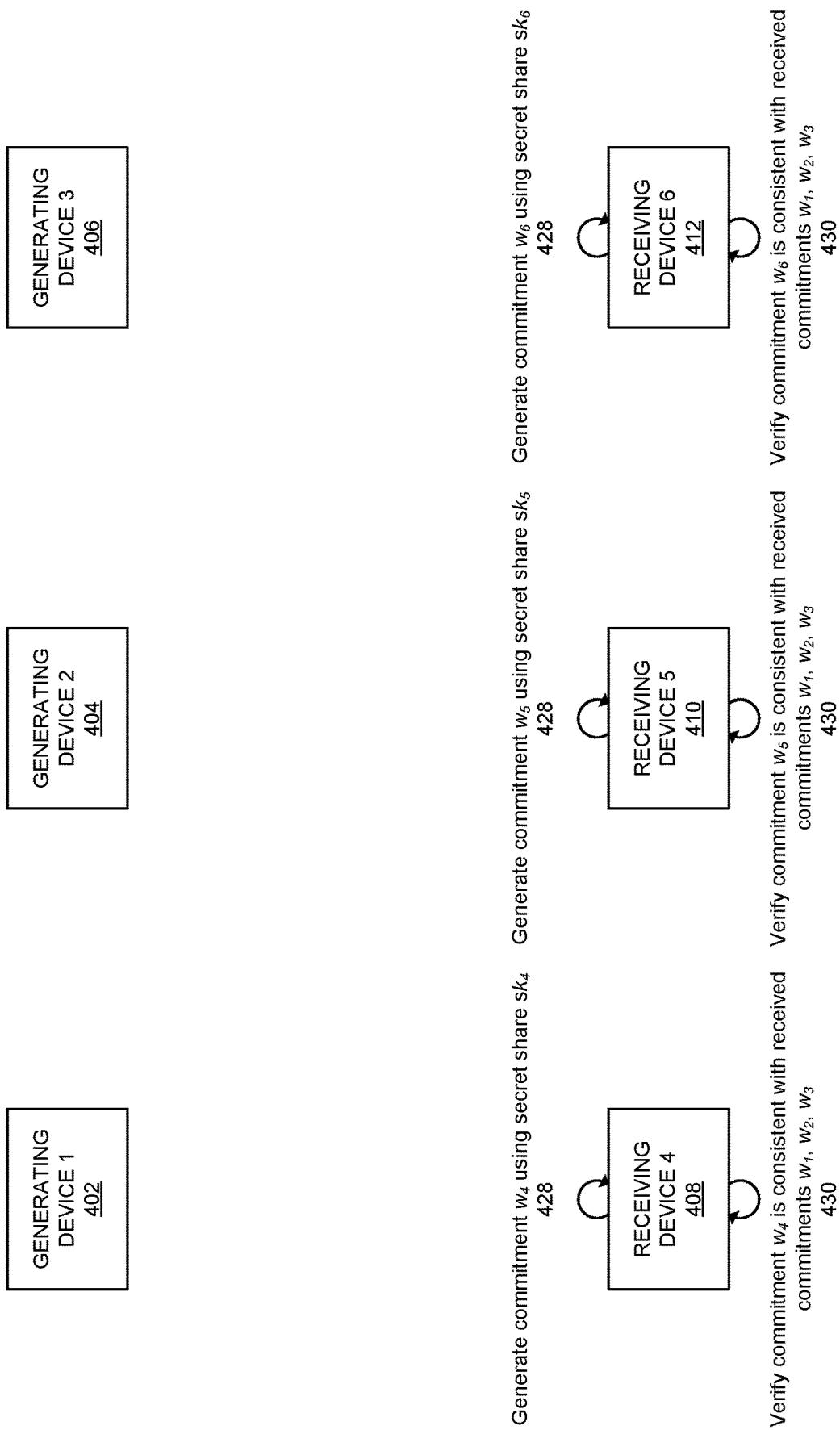

Referring now to FIG. 4D, at step 428, the receiving devices can each generate a receiving device commitment $w_j$ using the secret shares $sk_j$ generated by the receiving devices at step 424 (see FIG. 4B). That is, receiving device 4 408 can generate commitment $w_4$, receiving device 5 410 can generate commitment $w_5$, and receiving device 6 412 can generate commitment $w_6$. Generating a receiving device commitment can comprise, for example, performing a group exponentiation operation on a generator value g (corresponding to a mathematical group in which the decisional Diffie-Hellman assumption holds) using their respective secret shares $sk_j$, i.e., $g^{sk_j}$. If the cryptographic devices are known to be honest, it may not be necessary for the receiving devices to generate their own commitments, therefore step 428 is optional.

At step 430, the receiving devices can each verify that their commitments, generated at step 428 are consistent with the plurality of commitments received from the generating devices at step 426 (see FIG. 4C), i.e., commitments $w_1$, $w_2$, and $w_3$. This can be accomplished by exponentiating each commitment of the plurality of commitments using a corresponding coefficient (e.g., a Lagrange coefficient), then calculating the product of the exponentiated commitments and comparing this product to the commitment corresponding to the respective receiving device. For example, receiving device 4 408 can calculate $w_1^{\lambda_{1,4}} * w_2^{\lambda_{2,4}} * w_3^{\lambda_{3,4}}$ and compare this value to commitment $w_4$. If these values are equal, the receiving devices can conclude that their commitments (and their respective secret shares) were generated properly. If these values are not equal, the receiving devices can conclude that either they were transmitted an erroneous commitment or generated an erroneous secret share. If this is the case, any receiving device can terminate the secret share distribution process. If the cryptographic devices are known to be honest, it may not be necessary for the receiving devices to verify that their commitments are consistent with the commitments generated by the generating devices, and therefore step 430 may be optional.

E. Proof Verification and Generation of Confirmation Values

Referring now to FIG. 4E, at step 432, each cryptographic device can verify the zero-knowledge proofs generated by the generating devices at step 416 (see FIG. 4A). Each receiving device 4 408, 5 410, and 6 412 can verify all three zero-knowledge proofs $zk_1$, $zk_2$, $zk_3$, while each generating device can verify the zero-knowledge proofs generated by the other two generating devices. That is, generating device 1 402 can verify zero-knowledge proofs $zk_2$ and $zk_3$, generating device 2 404 can verify zero-knowledge proofs $zk_1$ and $zk_3$, and generating device 3 406 can verify zero-knowledge proofs $zk_1$ and $zk_2$. The zero-knowledge proofs can be verified using the plurality of commitments $w_i$ generated at step 416 and optionally a witness statement, using any appropriate zero-knowledge proof scheme. If the cryptographic devices are known to be honest, it may not be necessary to verify (or generate) the zero-knowledge proofs, and consequently, step 432 may be optional.

At step 434, a plurality of confirming devices can each generate a confirmation value $a_i$ based on the commitments generated by the generating devices (at step 416 in FIG. 4A) and transmitted to the all other cryptographic devices (at step 426 in FIG. 4C), i.e., commitments $w_1$, $w_2$, and $w_3$. This plurality of confirming devices can comprise at least a threshold number t of cryptographic devices from among the plurality of cryptographic devices (generating devices 402-406 and receiving devices 408-412). In some embodiments, the plurality of confirming devices can comprise the generating devices, in others, the plurality of confirming devices can comprise some number of generating devices and some number of receiving devices. In yet others, every cryptographic device (i.e., more than a threshold number t) can act as confirming devices. If the cryptographic devices are known to be honest, it may not be necessary to generate the confirmation values, and consequently step 434 may be optional.

The confirming devices can each generate a confirmation value based on the commitments $w_i$ generated by the generating devices (i.e., commitments $w_1$, $w_2$, and $w_3$ generated at step 416). If a generating device (e.g., generating device 1 402) is also a confirming device, the generating device can generate the confirmation value based on the commitment (generated by generating device 1 402) and the one or more other commitments (generated by generating devices 2 404 and 3 406). The confirmation values can comprise a plurality of hashed commitments. Generating confirmation values can comprise, for example, concatenating the commitments $w_1$, $w_2$, and $w_3$, then generating the confirmation value by hashing the concatenation using a hash function, i.e., $a_i = H(w_1, w_2, w_3)$.

F. Verification of Confirmation Values

Figure 4F:
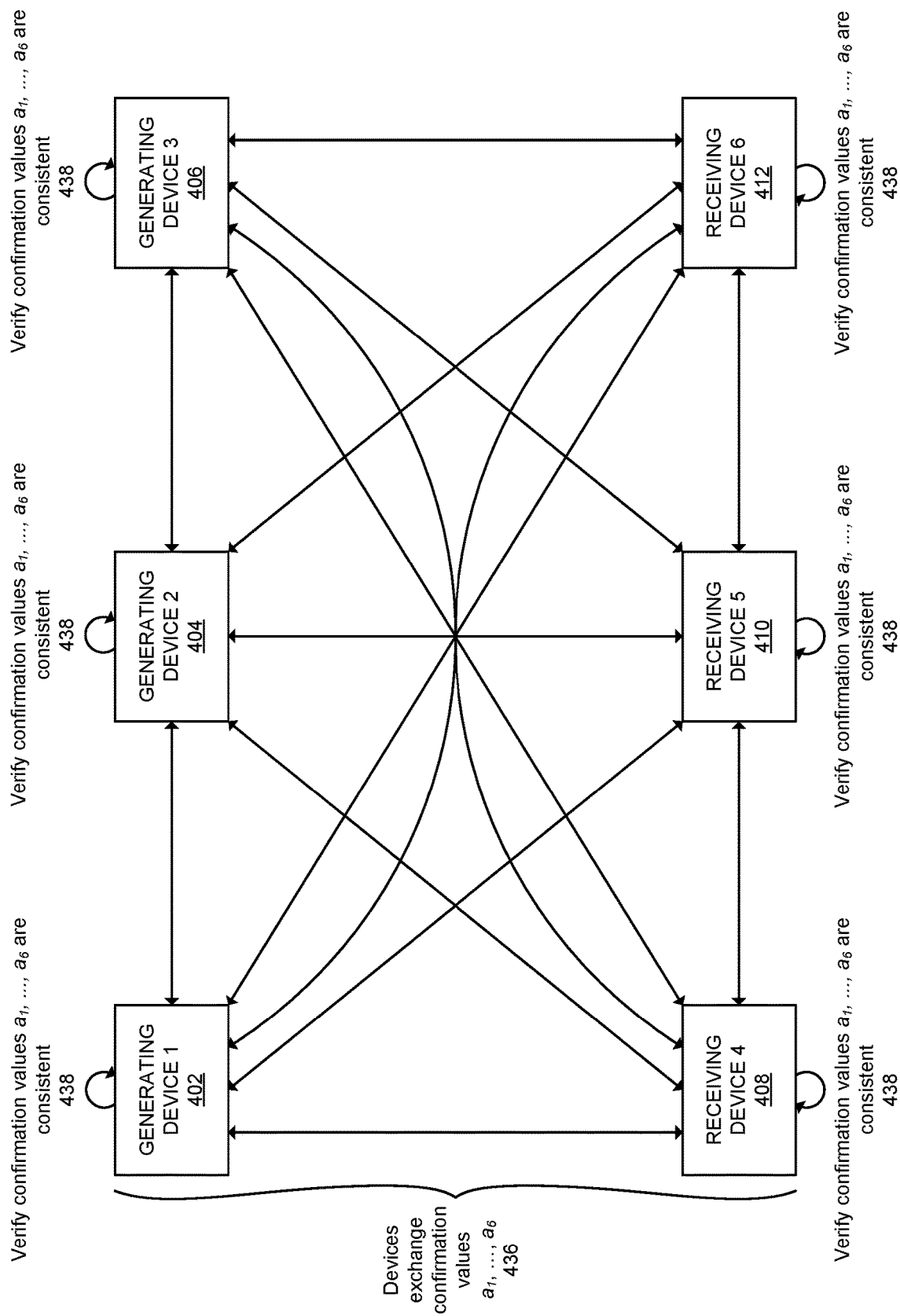

Referring now to FIG. 4F, at step 436, the plurality of confirming devices can transmit their confirmation values $a_i$ generated at step 434 to the plurality of cryptographic devices (i.e., generating devices 402-406 and receiving devices 408-412). In this way, each cryptographic device can receive a plurality of confirming values (i.e., confirming values $a_1, \ldots, a_6$) from the plurality of confirming devices. These confirming values $a_i$ can be used in subsequent steps to verify that the secret share generation process was performed correctly.

At step 438, the cryptographic devices can verify that the confirmation values $a_1$, $a_2$, $a_3$, $a_4$, $a_5$, and $a_6$ are equivalent. Doing so is equivalent to verifying that the generating devices transmitted the same commitments $w_1$, $w_2$, and $w_3$ to each cryptographic device. This can be accomplished using any known means of equivalence checking. For example, the generating devices 402-406 and receiving devices 408-410 can compare each bit of each digital representation of each confirmation value to verify that the bits are the same, using a Boolean function such as AND. If any cryptographic device determines that the confirmation values are not equivalent, it can send a message to the other cryptographic devices informing them of the error and abort the distributed symmetric cryptographic protocol, deleting their (potentially invalid) secret share in the process. If step 438 is completed successfully, the cryptographic devices can store their respective secret shares (e.g., in a secure memory element) and can later use them to perform distributed symmetric cryptographic operations (e.g., encryption and decryption), as described below. If the cryptographic devices are known or assumed to be honest, it may not be necessary to verify the confirmation values, and thus step 438 may be optional.

V. Distributed Symmetric Cryptography

Once the secret shares have been distributed to the cryptographic devices, the cryptographic devices can use the secret shares to perform distributed symmetric cryptographic operations, including encryption and decryption. This Section generally describes a distributed symmetric encryption process and a distributed symmetric decryption process with reference to FIGS. 5 and 6 in order to provide a broader context for the methods and systems used to distribute secret shares described above. The description is intended to be illustrative and not limiting. There are many ways in which distributed symmetric cryptography may be performed. More details on potential implementations of distributed symmetric cryptography can be found in U.S.

Publication No. 2021/0243020, U.S. patent application Ser. No. 16/861,138, and U.S. Patent Application No. PCT/US2021/029429, which are incorporated by reference in their entirety for all purposes.

A. Distributed Symmetric Encryption

Figure 5:
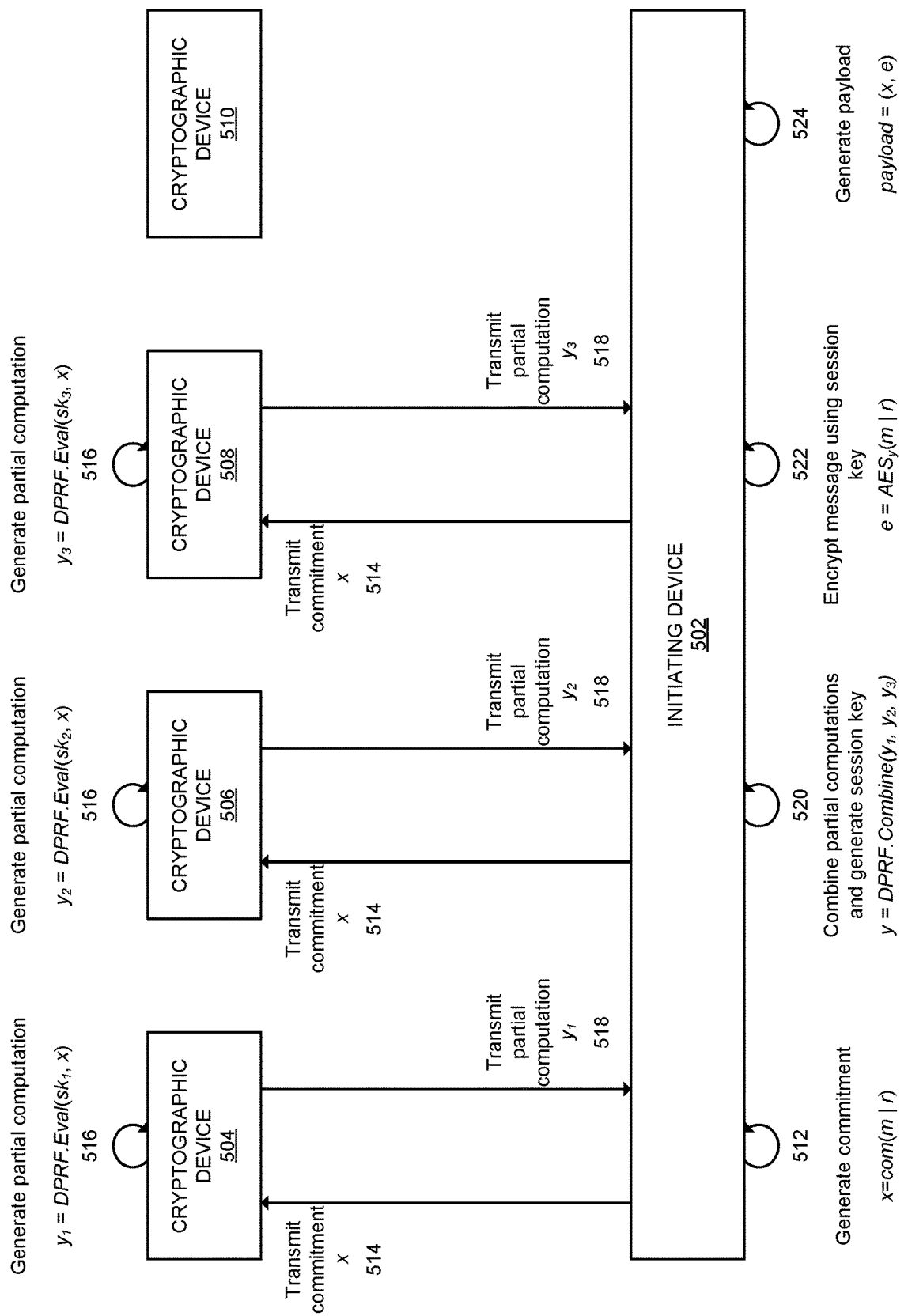
FIG. 5 shows a hybrid sequence diagram corresponding to an exemplary method of distributed symmetric encryption.

FIG. 5 shows a hybrid sequence diagram of an exemplary distributed symmetric encryption process performed by an initiating device 502 and a plurality of cryptographic devices 504-510. A threshold number of cryptographic devices may participate in the distributed symmetric encryption process. In FIG. 5, three cryptographic devices (cryptographic devices 504-508) are shown participating in the encryption process, while a fourth cryptographic device (cryptographic device 510) is not participating. This illustration is intended only as a non-limiting example. Threshold distributed symmetric cryptography can be performed with any total and threshold number of cryptographic devices.

The initiating device 502 may comprise any device or computer system that initiates the distributed symmetric encryption process. As an example, the initiating device 502 may comprise a client computer that possesses a message m that the client computer (or its operator) wants to encrypt. A network of cryptographic devices (i.e., cryptographic devices 504-510) may perform distributed symmetric cryptography as a service to the client computer. Alternatively, the initiating device 502 may comprise a cryptographic device that possesses a message m and initiates an encryption operation with cryptographic devices 504-510.

At step 512, the initiating device 502 can generate a commitment x. The commitment may be generated based on a message m and a random value r (alternatively referred to as a "random nonce"). The commitment x may comprise a hash value generated using the message m and the random value r as an input to a hash function (e.g., SHA-256).

At step 514, the initiating device 502 may transmit a request including the commitment x (sometimes referred to as a message commitment) to a plurality of participating cryptographic devices, i.e., cryptographic devices 504-508. The initiating device 502 may transmit the commitment x to the participating cryptographic devices 504-508 either directly or via a proxy device.

At step 516, the cryptographic devices 504-508 may generate partial computations $y_1$, $y_2$, and $y_3$ based on the message commitment x and their respective secret shares $sk_i$, $sk_2$, and $sk_3$. The cryptographic devices 504-508 may generate these partial computations $y_1$, $y_2$, and $y_3$ using a distributed pseudorandom function, as described above in Section II. The cryptographic devices 504-508 may generate the partial computation $y_1$, $y_2$, and $y_3$ by calling a distributed pseudorandom evaluation function DPRF.Eval, using the commitment x and the respective secret shares $sk_i$, $sk_2$, and $sk_3$ (i.e., $y_i$=DPRF.Eval($sk_i$, x)). The distributed pseudorandom function may comprise an elliptic curve cryptographic function. For example, cryptographic devices 504-508 may generate their corresponding partial computation $y_i$ by encrypting the commitment x using elliptic curve cryptography and their respective secret share $sk_i$ as the cryptographic key.

At step 518, the participating cryptographic devices 504-508 may transmit the partial computations $y_1$, $y_2$, and $y_3$ to initiating device 502. The participating cryptographic devices 504-508 may transmit the partial computations $y_1$, $y_2$, and $y_3$ either directly or via a proxy device.

Optionally at step 518, the participating cryptographic devices 504-508 may each transmit a non-interactive zero-knowledge proof (NIZK) to the initiating device 502. The initiating device 502 may use the NIZKs to verify that the partial computations $y_1$, $y_2$, and $y_3$ corresponding to those NIZKs were generated correctly. If any NIZKs fail to verify, the initiating device 502 can abort the distributed symmetric encryption process.

At step 520, initiating device 502 may combine the partial computations and generate a session key. Initiating device 502 may combine the partial computations $y_1$, $y_2$, and $y_3$ to generate a key generation seed, and the key generation seed may be used along with a key generation algorithm to generate the session key. The initiating device 502 may combine the partial computations using any appropriate means. For example, the initiating device 502 can use a distributed pseudorandom combination function DPRF.Combine using the partial computations $y_1$, $y_2$, and $y_3$ as arguments (i.e., y=DPRF.Combine($y_1$, $y_2$, $y_3$)). This function may involve initiating device 502 determining a plurality of Lagrange coefficients corresponding to the plurality of partial computations. The initiating device 502 may generate a plurality of intermediate computations by exponentiating each partial computation with its corresponding Lagrange coefficient. The initiating device 502 can then generate a key generation seed by calculating the product of the plurality of intermediate computations. The key generation seed may be input into a key generation algorithm to produce the session key. See Section II above for more detail.

At step 522, the initiating device 502 can encrypt the message m using the session key, thereby generating a ciphertext e. Alternatively, initiating device 502 can encrypt the message m and the random number r used to blind the commitment (see step 512). The initiating device 502 can encrypt the message using any appropriate symmetric cryptosystem corresponding to the cryptographic key, such as AES (e.g., as shown at step 522, where the ciphertext e=$AES_y$(m|r)).

At step 524, the initiating device 502 can generate a payload comprising the ciphertext e and the message commitment x. This payload comprises information that can be used to decrypt the ciphertext using distributed symmetric cryptography. The initiating device 502 can transmit this payload to a client computer in order to securely transmit the message m. Alternatively the initiating device 502 can store the payload in a database and retrieve the payload at a later time (e.g., when the initiating device 502 intends to decrypt the payload.

It should be understood that FIG. 5 is intended only to illustrate one implementation of a distributed symmetric encryption scheme. The purpose of FIG. 5 is largely to provide context for some embodiments, particularly methods and systems used to distribute secret shares. As such, FIG. 5 omits several steps or operations that may be advantageous in some implementations of distributed symmetric cryptography. It should be understood that embodiments of the present disclosure can be used in conjunction with these omitted operations, and are not solely limited to the generic implementation shown in FIG. 5. As an example, and as described in more detail in U.S. Publication No. 2021/0243020, the cryptographic devices could each generate and transmit a partial signature to the initiating device 502. The initiating device 502 can combine these partial signatures to generate a verification signature that can later be used in a distributed symmetric decryption operation. Additionally, the participating cryptographic devices 504-508 can each record, in a log file, the encryption operation performed by the initiating device 502 and the participating cryptographic devices 504-508.

As another example, as described in more detail in U.S. patent application Ser. No. 16/816,138, the initiating device 502 can generate and transmit two commitments instead of a single commitment to the cryptographic devices. Each participating cryptographic device 504-508 can generate two partial computations based on the commitments (e.g., at step 516), then combine these two partial computations to produce a single partial computation, which can then be transmitted back to the initiating device 502 at step 518. The use of multiple secret shares may make the distributed cryptographic system resistant to adaptive cryptographic attack, as the partial computations used to generate the cryptographic key (i.e., at step 520) are not bound to a single secret value or single set of secret shares.

As yet another example, as described in more detail in U.S. Patent Application No. PCT/US2021/029429, the initiating device 502 can possess multiple messages $m_1, \ldots, m_n$ that it intends to encrypt. Rather than generate a commitment x of a single message, The initiating device 502 can instead generate a commitment of an identifier id corresponding to the initiating device 502. The resulting partial computations $y_1, y_2, y_3$ (i.e., those received by the initiating device 502 at step 518), can be combined by the initiating device 502 to generate a bulk key bk. For each message $m_1, \ldots, m_n$ that the initiating device 502 intends to encrypt, the initiating device 502 can derive a message key using a bilinear pairing between the bulk key and a commitment corresponding to the message. The initiating device 502 can then encrypt each message with its corresponding message key. This method may be faster than, e.g., performing multiple rounds of communication with the cryptographic devices to generate partial computations corresponding to each message key. Likewise, this method may be more secure than reusing a single cryptographic key on multiple distinct messages.

B. Distributed Symmetric Decryption

Figure 6:
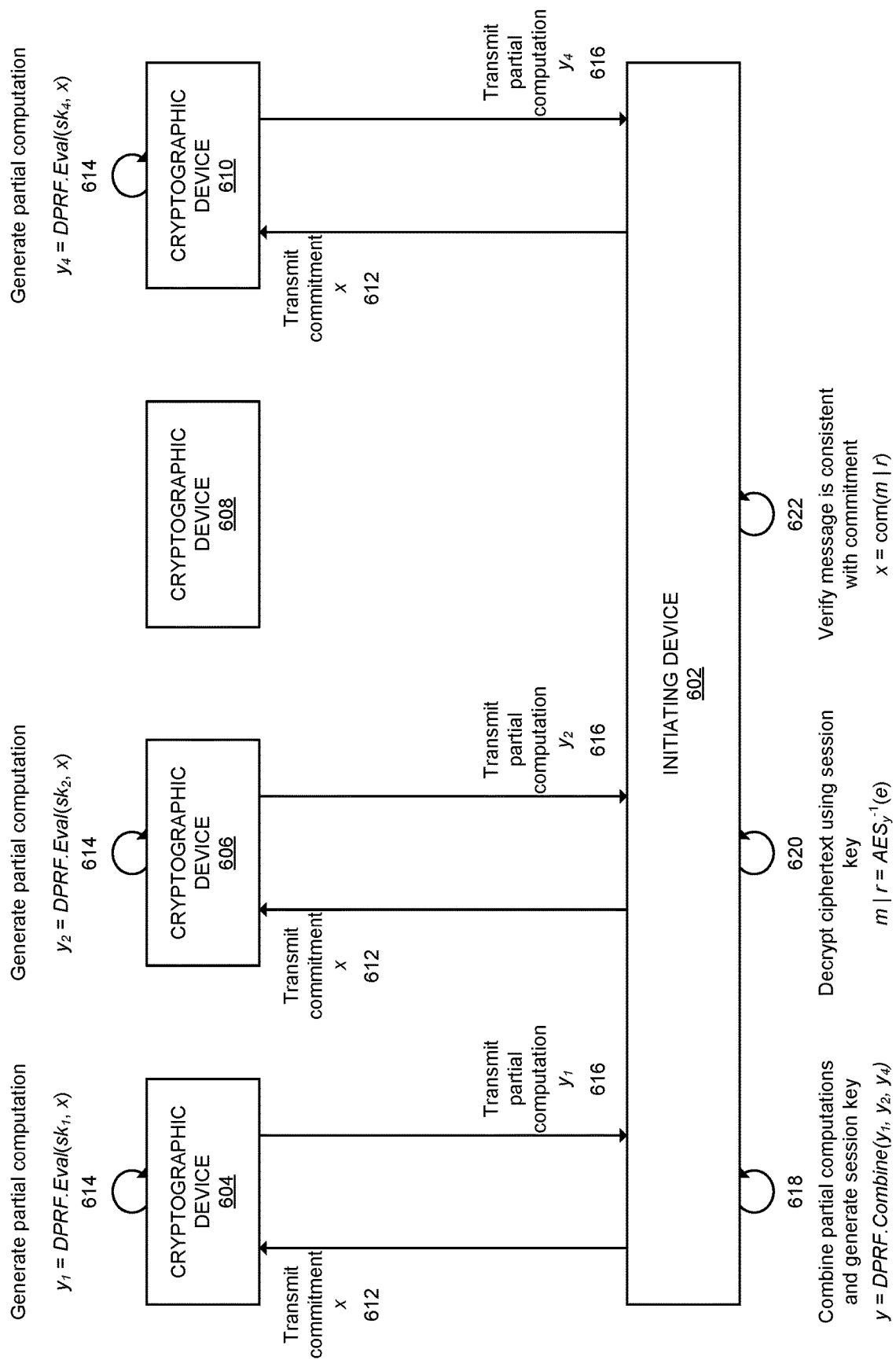
FIG. 6 shows a hybrid sequence diagram corresponding to an exemplary method of distributed symmetric decryption.

FIG. 6 shows a hybrid sequence diagram of an exemplary distributed symmetric decryption process, performed by an initiating device 602 and a plurality of cryptographic devices 604-610. A threshold number of cryptographic devices may participate in the distributed symmetric decryption process. In FIG. 6, three cryptographic devices (cryptographic devices 604, 606, 610) are shown participating in the decryption process, while a fourth cryptographic device (cryptographic device 608) is not participating. Notably, the initiating device 602 can perform distributed symmetric decryption with cryptographic devices other than the cryptographic devices used during distributed symmetric encryption (e.g., cryptographic devices 504-508 from FIG. 5). The process illustrated by FIG. 6 is intended only as a non-limiting example. Threshold distributed symmetric cryptography can be performed with any total and threshold number of cryptographic devices.

At step 612 the initiating device 602 can transmit the message commitment x to the cryptographic devices 604, 606, and 610. The initiating device 602 may have generated this commitment itself, or may have received the commitment from another computer, such as a client computer. For example, a client computer may have performed a distributed symmetric encryption process and generated a payload comprising a ciphertext e and a commitment x. The client computer may have transmitted this payload to initiating device 602, and initiating device 602 may transmit the commitment received in the payload to cryptographic devices 604, 606, and 610. The initiating device 602 may transmit the commitment to cryptographic devices 604, 606, and 610 either directly or via a proxy device. Regardless of its source, the message commitment may be generated using a message and a hash function.

At step 614, cryptographic devices 604, 606, and 610 can generate partial computations $y_1$, $y_2$, and $y_4$ based on the message commitment x and their respective secret shares $sk_1$, $sk_2$, and $sk_4$. The cryptographic devices 604, 606, and 610 may generate these partial computations using a distributed pseudorandom function, as described above in Section II. For example, as shown in FIG. 6, cryptographic devices 604, 606, and 610 may execute a DPRF.Eval function using their respective secret shares and the commitment as arguments. The distributed pseudorandom function may comprise an elliptic curve cryptographic function. For example, cryptographic devices 604, 606, and 610 may each generate a partial computation by encrypting the commitment using elliptic curve cryptography by using their respective secret share as a cryptographic key.

At step 616, the participating cryptographic devices 604, 606, and 610 may transmit the partial computations $y_1$, $y_2$, and $y_4$ to initiating device 602. The participating cryptographic devices 604, 606, and 610 may transmit the partial computations either directly or via a proxy device.

Optionally at step 616, the participating cryptographic devices 604, 606, and 610 may each transmit a non-interactive zero knowledge proof (NIZK) to the initiating device 602. The initiating device 602 may use the NIZKs to verify that the partial computations corresponding to those NIZKs were generated correctly. If any NIZKs fail to verify, the initiating device 602 can abort the distributed symmetric decryption process.

At step 618, initiating device 602 may combine the partial computations and generate a session key. Initiating device 602 may combine the partial computations to generate a key generation seed, then use the key generation seed as an input to a key generation algorithm in order to generate the session key. The initiating device 602 may combine the partial computations using any appropriate means, such as a DPRF-.Combine function that uses the partial computations $y_1$, $y_2$, and $y_4$ as arguments. For example, initiating device 602 may first determine a plurality of Lagrange coefficients corresponding to the plurality of partial computations. Initiating device 602 can generate a plurality of intermediate computations by exponentiating each partial computation with its corresponding Lagrange coefficient. Initiating device 602 can then generate a key generation seed by calculating the product of the plurality of intermediate computations. Initiating device 602 can then input the key generation seed into a key generation algorithm to produce the cryptographic key. See Section II above for more detail.

Figure 7:
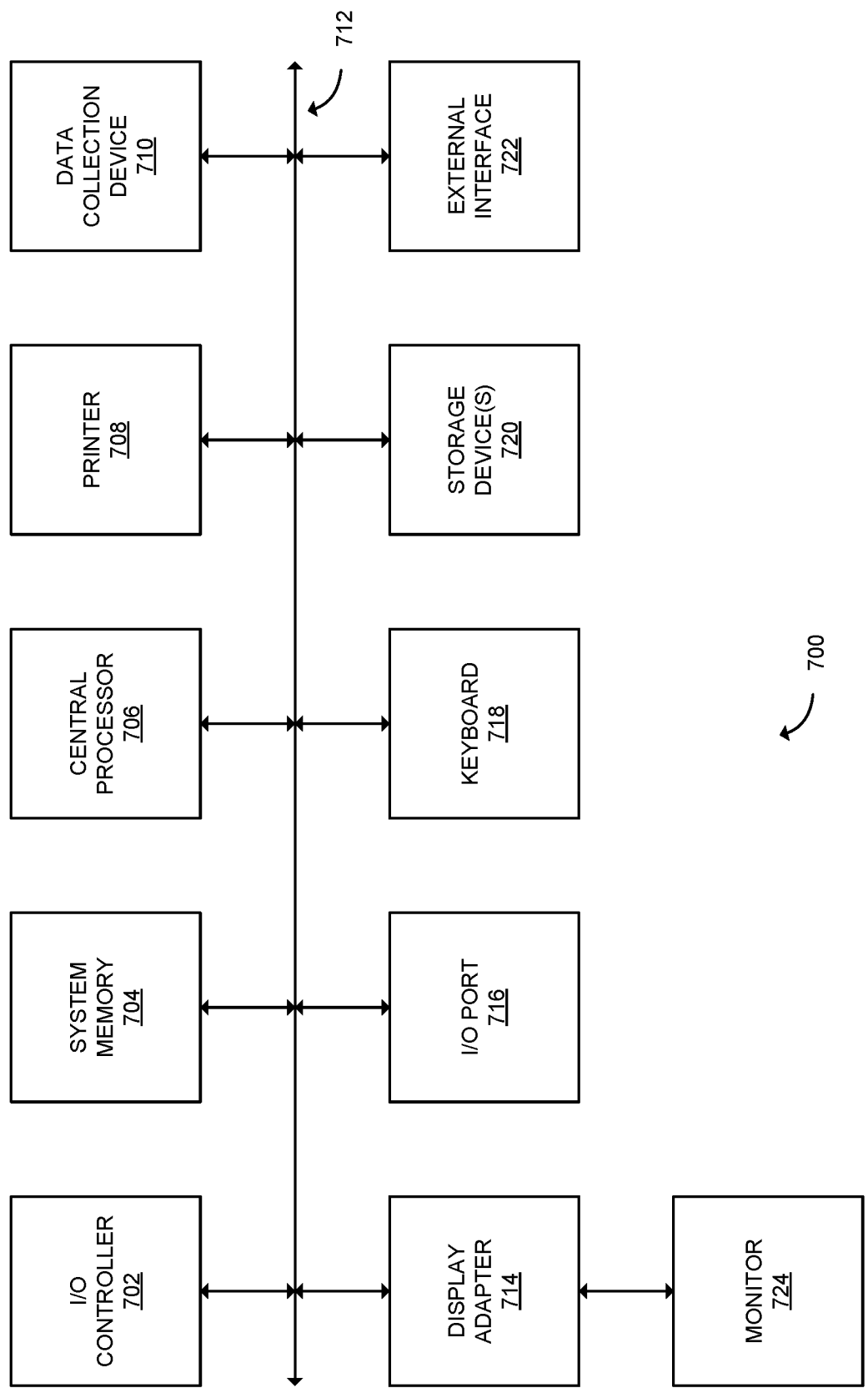
FIG. 7 shows an exemplary computer system according to some embodiments.

At step 620, initiating device 602 can decrypt the ciphertext using the session key to generate the message m. Alternatively, initiating device 602 can decrypt the ciphertext to produce the message m and a random value r used to blind the commitment (see step 512 of FIG. 5). The initiating device 602 can decrypt the ciphertext using any appropriate symmetric cryptosystem corresponding to the cryptographic key, such as AES (e.g., as shown in FIG. 7, $m|r=AES_y^{-1}(e)$).

At optional step 622, the initiating device 602 can verify the message m is consistent with the message commitment x. The initiating device 602 can use the message and the random value as an input to a hash function to generate an additional commitment. The initiating device 602 can then compare the commitment transmitted in step 612 to the commitment generated at step 622. If the commitments are identical, it indicates that the message was encrypted and decrypted correctly.

It should be understood that FIG. 6 is intended only to illustrate one implementation of a distributed symmetric decryption scheme. The purpose of FIG. 6 is largely to provide context for some embodiments. As such, FIG. 6 omits several steps or operations that may be advantageous in some implementations of distributed symmetric cryptography. It should be understood that embodiments of the present disclosure can be used in conjunction with these omitted operations, and are not solely limited to the generic implementation shown in FIG. 6. As an example, and as described in more detail in U.S. Publication No. US-2021-0243020-A1, the distributed cryptographic scheme could involve the use of verification signatures and cryptographic logging in order to provide for "ciphertext accountability," i.e., the ability to verify the cryptographic actions (such as encryption or decryption) performed by the initiating device 602. In addition to the commitment x, at step 612 the initiating device can transmit a verification signature to the cryptographic devices 604, 606, and 610. Each cryptographic device 604, 606, and 610 can then verify the verification signature using a verification key vk corresponding to the verification signature. If the verification signature fails to verify, any cryptographic device 604, 606, or 610 can abort the distributed symmetric decryption operation. Additionally, each cryptographic device 604, 606, and 610 can record the initiating device's 602 intent to decrypt ciphertext in a log file, allowing for ciphertext accountability. Afterwards, each cryptographic device 604, 606, and 610 can generate their respective partial computation and transmit it to the initiating device 602 (e.g., at step 616). The initiating device 602 can then combine the partial computations to produce a cryptographic key, then decrypt the ciphertext using the cryptographic key to produce the message.

As another example, as described in more detail in U.S. patent application Ser. No. 16/816,138, the distributed cryptography scheme may involve the use of two commitments (and optionally a verification signature). By using two commitments, the distributed cryptography scheme is more resistant to adaptive cryptographic attacks. Rather than transmitting the commitment x to participating cryptographic devices 604, 606, and 610 at step 612, the initiating device 602 can instead transmit two commitments and a verification signature to the cryptographic devices 604, 606, and 610. The cryptographic devices 604, 606, and 610 can each use the two commitments to generate two partial computations, then combine the two partial computations into a single partial computation. Each cryptographic device 604, 606, and 610 can transmit their single partial computation back to the initiating device 602, which can subsequently combine the partial computations to produce a cryptographic key, then use the cryptographic key to decrypt a ciphertext and produce the message.

As yet another example, as described in more detail in U.S. Patent Application No. PCT/US2021/029429, the distributed symmetric cryptography scheme may involve the generation and use of bulk keys and message keys. A bulk key may be generated for a set of messages, and from the bulk key, message keys may be generated in order to encrypt individual messages. As such, when decrypting a message, instead of transmitting the commitment x to the cryptographic devices at step 612, the initiating device 602 can transmit an input value, either comprising a nonce p, or an identifier id and a hash value a. If necessary, the participating cryptographic devices 604, 606 and 610 can use the identifier id and hash value a to generate the nonce p using two hash functions and a bilinear pairing. Each participating cryptographic device can then calculate a partial computation based on their respective secret share and the nonce p, then transmit those partial computations to the initiating device 602. The initiating device 602 can then combine the partial computations to produce a message key in order to decrypt the message.

VI. Computer System

Any of the computer systems mentioned herein may utilize any suitable number of subsystems. Examples of such subsystems are shown in FIG. 7 in computer system 700. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 7 are interconnected via a system bus 712. Additional subsystems such as a printer 708, keyboard 718, storage device(s) 720, monitor 724 (e.g., a display screen, such as an LED), which is coupled to display adapter 714, and others are shown. Peripherals and input/output (I/O) devices, which couple to I/O controller 702, can be connected to the computer system by any number of means known in the art such as input/output (I/O) port 716 (e.g., USB, FireWire®). For example, I/O port 716 or external interface 722 (e.g. Ethernet, Wi-Fi, etc.) can be used to connect computer system 700 to a wide area network such as the Internet, a mouse input device, or a scanner. The interconnection via system bus 712 allows the central processor 706 to communicate with each subsystem and to control the execution of a plurality of instructions from system memory 704 or the storage device(s) 720 (e.g., a fixed disk, such as a hard drive, or optical disk), as well as the exchange of information between subsystems. The system memory 704 and/or the storage device(s) 720 may embody a computer readable medium. Another subsystem is a data collection device 710, such as a camera, microphone, accelerometer, and the like. Any of the data mentioned herein can be output from one component to another component and can be output to the user.

A computer system can include a plurality of the same components or subsystems, e.g., connected together by external interface 722, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Any of the computer systems mentioned herein may utilize any suitable number of subsystems. In some embodiments, a computer system includes a single computer apparatus, where the subsystems can be components of the computer apparatus. In other embodiments, a computer system can include multiple computer apparatuses, each being a subsystem, with internal components.

A computer system can include a plurality of the components or subsystems, e.g., connected together by external interface or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can be involve computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be involve specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

What is claimed is:

1. A method comprising performing, by a generating device of a plurality of generating devices:
    generating a secret share using a random sampling process;
    generating a plurality of partial secret shares using a plurality of coefficients and the secret share, the plurality of partial secret shares corresponding to a plurality of receiving devices, wherein a plurality of cryptographic devices includes the plurality of generating devices and the plurality of receiving devices;
    generating a blinding value using a plurality of seed values and a pseudorandom function;
    generating a plurality of blinded partial secret shares by adding the blinding value to each partial secret share of the plurality of partial secret shares; and
    transmitting each blinded partial secret share of the plurality of blinded partial secret shares to a corresponding receiving device of the plurality of receiving devices, wherein each receiving device combines a respective blinded partial secret share of the plurality of blinded partial secret shares and one or more other blinded partial secret shares received from one or more other generating devices of the plurality of generating devices, each corresponding receiving device of the plurality of receiving devices thereby generating a corresponding receiving device secret share.

2. The method of claim 1, further comprising:
    receiving, from an initiating device, a request including a message commitment generated using a message and a hash function;
    generating a partial computation based on the secret share and the message commitment; and
    transmitting the partial computation to the initiating device, thereby enabling the initiating device to: (1) generate a session key using the partial computation, (2) encrypt the message using the session key, thereby generating a ciphertext, and (3) generate a payload comprising the ciphertext and the message commitment.

3. The method of claim 1, further comprising:
receiving, from an initiating device, a request including a message commitment generated using a message and a hash function;
generating a partial computation based on the secret share and the message commitment; and
transmitting the partial computation to the initiating device, thereby enabling the initiating device to: (1) generate a session key using the partial computation, (2) decrypt a ciphertext using the session key, thereby generating the message, and (3) verify that the message is consistent with the message commitment.

4. The method of claim 1, wherein the random sampling process comprises sampling from an interval of positive integers defined by a prime order value.

5. The method of claim 1, wherein generating a commitment of the secret share comprises performing a group exponentiation operation on a generator value using the secret share.

6. The method of claim 1, wherein the plurality of coefficients comprise a plurality of Lagrange coefficients, wherein each Lagrange coefficient of the plurality of Lagrange coefficients corresponds to the generating device and a respective receiving device of the plurality of receiving devices.

7. The method of claim 1, wherein each seed value of the plurality of seed values corresponds to the generating device and a respective generating device of the plurality of generating devices, and wherein generating the blinding value using the plurality of seed values and the pseudorandom function comprises:
generating a plurality of random values using the plurality of seed values and the pseudorandom function; and
generating the blinding value by combining the plurality of random values.

8. The method of claim 7, wherein generating the plurality of random values using the plurality of seed values and the pseudorandom function comprises:
for each seed value of the plurality of seed values, generating a corresponding random value by evaluating the pseudorandom function using the seed value and a nonce as inputs.

9. The method of claim 7, wherein each random value of the plurality of random values corresponds to a respective numeric generating device identifier of a plurality of numeric generating device identifiers, and wherein combining the plurality of random values comprises:
generating a first sum, the first sum comprising a sum of a first set of random values of the plurality of random values, wherein each random value of the first set of random values corresponds to a respective numeric generating device identifier that is less than a numeric identifier associated with the generating device;
generating a second sum, the second sum comprising a sum of a second set of random values of the plurality of random values, wherein each random value of the second set of random values corresponds to a respective numeric generating device identifier that is greater than the numeric identifier associated with the generating device; and
combining the plurality of random values by calculating a difference between the first sum and the second sum.

10. The method of claim 1, further comprising:
generating a commitment of the secret share;
generating a zero-knowledge proof corresponding to the secret share and the commitment;
transmitting the commitment and the zero-knowledge proof to the plurality of cryptographic devices;
receiving, from the one or more other generating devices, one or more other commitments and one or more other zero-knowledge proofs;
verifying the one or more other zero-knowledge proofs using the one or more other commitments;
receiving a plurality of confirmation values from a plurality of confirming devices, wherein the plurality of confirmation values comprise a plurality of hashed commitments, wherein the plurality of cryptographic devices includes the plurality of confirming devices; and
verifying that the plurality of confirmation values are equivalent.

11. The method of claim 10, wherein the plurality of confirming devices comprises a threshold number of confirming devices selected from among the plurality of cryptographic devices and wherein the plurality of generating devices comprises a threshold number of generating devices selected from among the plurality of cryptographic devices.

12. The method of claim 10, wherein the plurality of confirming devices comprises the plurality of cryptographic devices.

13. The method of claim 10, wherein the generating device comprises a confirming device of the plurality of confirming devices, and wherein the method further comprises:
generating a confirmation value based on the commitment and the one or more other commitments; and
transmitting the confirmation value to the plurality of cryptographic devices.

14. The method of claim 13, wherein generating the confirmation value using the commitment and the one or more other commitments comprises:
concatenating the commitment and the one or more other commitments, thereby generating a concatenation; and
generating the confirmation value by hashing the concatenation using a hash function.

15. A method comprising performing, by a receiving device:
receiving a plurality of blinded partial secret shares from a plurality of generating devices, each blinded partial secret share of the plurality of blinded partial secret shares corresponding to a different generating device of the plurality of generating devices;
generating a secret share by combining the plurality of blinded partial secret shares;
receiving a plurality of commitments and a plurality of zero-knowledge proofs from the plurality of generating devices;
generating a receiving device commitment based on the secret share;
verifying that the receiving device commitment is consistent with the plurality of commitments;
verifying the plurality of zero-knowledge proofs using the plurality of commitments;
receiving a plurality of confirmation values from a plurality of confirming devices, wherein the plurality of confirmation values comprise a plurality of hashed commitments; and
verifying that the plurality of confirmation values are equivalent.

16. The method of claim 15, wherein the receiving device comprises a confirming device of the plurality of confirming devices, and wherein the method further comprises:

generating a confirmation value based on the plurality of commitments; and transmitting the confirmation value to a plurality of cryptographic devices, the plurality of cryptographic devices comprising the plurality of generating devices and a plurality of receiving devices.

17. The method of claim 15, wherein the secret share comprises a sum of the plurality of blinded partial secret shares, and wherein generating the secret share comprises calculating the sum of the plurality of blinded partial secret shares.

18. The method of claim 15, wherein generating the receiving device commitment based on the secret share comprises performing a group exponentiation operation on a generator value using the secret share.

19. The method of claim 18, wherein verifying the receiving device commitment is consistent with the plurality of commitments comprises:

exponentiating each commitment of the plurality of commitments using a corresponding coefficient of a plurality of coefficients, thereby generating a plurality of exponentiated commitments;

calculating a product of the exponentiated commitments; and verifying that the receiving device commitment is equivalent to the product of the exponentiated commitments.

20. A cryptographic device comprising:

a processor; and a non-transitory computer readable medium coupled to the processor, the non-transitory computer readable medium comprising code, executable by the processor for implementing a method performed by a generating device of a plurality of generating devices, the method comprising:

generating a secret share using a random sampling process;

generating a plurality of partial secret shares using a plurality of coefficients and the secret share, the plurality of partial secret shares corresponding to a plurality of receiving devices, wherein a plurality of cryptographic devices includes the plurality of generating devices and the plurality of receiving devices;

generating a blinding value using a plurality of seed values and a pseudorandom function;

generating a plurality of blinded partial secret shares by adding the blinding value to each partial secret share of the plurality of partial secret shares; and transmitting each blinded partial secret share of the plurality of blinded partial secret shares to a corresponding receiving device of the plurality of receiving devices, wherein each receiving device combines a respective blinded partial secret share of the plurality of blinded partial secret shares and one or more other blinded partial secret shares received from one or more other generating devices of the plurality of generating devices, each corresponding receiving device of the plurality of receiving devices thereby generating a corresponding receiving device secret share.

* * * * *